United States Patent
Endtner et al.

(10) Patent No.: US 12,516,177 B2
(45) Date of Patent: Jan. 6, 2026

(54) HIGH VOLTAGE COMPONENTS

(71) Applicant: ENVALIOR DEUTSCHLAND GMBH, Duesseldorf (DE)

(72) Inventors: Jochen Endtner, Cologne (DE); Dirk Schmitz, Weeze (DE); Matthias Bienmueller, Krefeld (DE); Wolfgang Wambach, Cologne (DE)

(73) Assignee: ENVALIOR DEUTSCHLAND GMBH, Duesseldorf (DE)

( * ) Notice: Subject to any disclaimer, the term of this patent is extended or adjusted under 35 U.S.C. 154(b) by 251 days.

(21) Appl. No.: 17/439,615

(22) PCT Filed: Mar. 12, 2020

(86) PCT No.: PCT/EP2020/056705
§ 371 (c)(1),
(2) Date: Sep. 15, 2021

(87) PCT Pub. No.: WO2020/187704
PCT Pub. Date: Sep. 24, 2020

(65) Prior Publication Data
US 2022/0153961 A1  May 19, 2022

(30) Foreign Application Priority Data

Mar. 15, 2019 (EP) .................... 19163038

(51) Int. Cl.
| | | |
|---|---|---|
| C08K 5/3465 | (2006.01) | |
| B29K 67/00 | (2006.01) | |
| B29K 105/00 | (2006.01) | |
| C08K 3/013 | (2018.01) | |
| C08K 3/016 | (2018.01) | |
| C08K 5/00 | (2006.01) | |
| C08K 5/13 | (2006.01) | |
| B29B 9/06 | (2006.01) | |

(52) U.S. Cl.
CPC ............ *C08K 5/3465* (2013.01); *C08K 3/013* (2018.01); *C08K 3/016* (2018.01); *C08K 5/0066* (2013.01); *C08K 5/13* (2013.01); *B29B 9/06* (2013.01); *B29K 2067/006* (2013.01); *B29K 2105/0026* (2013.01); *B29K 2105/005* (2013.01); *C08K 2201/014* (2013.01)

(58) Field of Classification Search
CPC ...... C08K 5/3465; C08K 3/013; C08K 3/016; C08K 5/0066; C08K 5/13; B29B 9/06; B29K 2067/006; B29K 2105/0026; B29K 2105/005; C08L 69/00; C08L 67/02
See application file for complete search history.

(56) References Cited

U.S. PATENT DOCUMENTS

| | | |
|---|---|---|
| 2,991,273 A | 7/1961 | Wilhelm et al. |
| 2,999,835 A | 9/1961 | Goldberg |
| 2,999,846 A | 9/1961 | Hermann et al. |
| 3,028,635 A | 4/1962 | Frederic |
| 3,062,781 A | 11/1962 | Ludwig et al. |
| 3,148,172 A | 9/1964 | Fox |
| 3,271,367 A | 9/1966 | Hermann et al. |
| 3,288,864 A | 11/1966 | Farnham |
| 3,442,864 A | 5/1969 | Magee |
| 3,644,574 A | 2/1972 | Jackson, Jr. |
| 3,737,409 A | 6/1973 | Fox |
| 3,879,348 A | 4/1975 | Serini et al. |
| 4,097,446 A | 6/1978 | Abolins et al. |
| 4,334,106 A | 6/1982 | Dai |
| 4,452,720 A | 6/1984 | Harada et al. |
| 4,806,593 A | 2/1989 | Kress et al. |
| 4,812,515 A | 3/1989 | Kress et al. |
| 4,859,740 A | 8/1989 | Damrath et al. |
| 4,861,831 A | 8/1989 | Damrath et al. |
| 4,937,285 A | 6/1990 | Wittmann et al. |
| 4,982,014 A | 1/1991 | Freitag et al. |
| 5,227,458 A | 7/1993 | Freitag |
| 5,399,659 A | 3/1995 | Kuhling et al. |
| 5,496,887 A | 3/1996 | Braune |

(Continued)

FOREIGN PATENT DOCUMENTS

| | | |
|---|---|---|
| CA | 2558151 | 8/2006 |
| DE | 1 031 512 B | 6/1958 |
| DE | 1 570 703 A1 | 2/1970 |
| DE | 2036052 A | 1/1972 |

(Continued)

OTHER PUBLICATIONS

HEV America Technical Specifications dated Nov. 1, 2004, obtained from the Internet on Sep. 14, 2021 at www.//avt.inl.gov/sites/default/files/pdf/hev/hevtechspecr1.pdf.
European Search Report from corresponding European U.S. Appl. No. 19/163,038, dated Aug. 9, 2019, two pages.
International Search Report from corresponding International Application No. PCT/EP2020/056705, dated Apr. 22, 2020, three pages.
Notice of Preliminary Rejection, KR Appln. No. 2021-7032679 (EN Translation), May 8, 2025.

*Primary Examiner* — Xiao S Zhao
*Assistant Examiner* — Inja Song
(74) *Attorney, Agent, or Firm* — NIXON & VANDERHYE P.C.

(57) ABSTRACT

The present invention relates to high-voltage components, especially for electromobility, comprising polymer compositions based on at least one polyester and 10,10'-oxybis-12H-phthaloperin-12-one, and to the use of 10,10'-oxybis-12H-phthaloperin-12-one for production of polyester-based products, with the proviso of a color difference ΔE<20 from the L*a*b* coordinates of a color number beginning with "2" in the RAL color chart, and to the use of 10,10'-oxybis-12H-phthaloperin-12-one for marking of polyester-based products as high-voltage components.

16 Claims, No Drawings

(56) References Cited

U.S. PATENT DOCUMENTS

| | | | |
|---|---|---|---|
| 5,786,351 A | | 7/1998 | Callewaert |
| 5,955,614 A | * | 9/1999 | Kalz ........................ C09B 25/00 |
| | | | 546/173 |
| 9,050,843 B2 | | 6/2015 | Duijnhoven Van et al. |
| 9,481,831 B2 | | 11/2016 | Bauer et al. |
| 11,081,255 B2 | | 8/2021 | Frigge et al. |
| 2003/0139498 A1 | * | 7/2003 | Thiebes .................. C09B 57/12 |
| | | | 546/15 |
| 2013/0017746 A1 | * | 1/2013 | Auktun ...................... C09J 7/21 |
| | | | 8/675 |
| 2013/0190425 A1 | * | 7/2013 | Zhu ......................... C08L 69/00 |
| | | | 523/451 |
| 2015/0368459 A1 | * | 12/2015 | Yamanaka .............. C08L 69/00 |
| | | | 524/504 |

FOREIGN PATENT DOCUMENTS

| | | | |
|---|---|---|---|
| DE | 2211956 A | | 10/1973 |
| DE | 4236122 A1 | | 4/1994 |
| JP | 47014742 Y1 | | 5/1972 |
| JP | 57167332 A2 | | 10/1982 |
| JP | 61062039 A2 | | 3/1986 |
| JP | 61062040 A2 | | 3/1986 |
| JP | 61105550 A2 | | 5/1986 |
| JP | 2013203933 A2 | | 10/2013 |
| JP | 6035150 B2 | | 11/2016 |
| JP | 2019038880 A2 | | 3/2019 |
| KR | 10-2006-0127244 | | 12/2006 |

\* cited by examiner

HIGH VOLTAGE COMPONENTS

This application is the U.S. national phase of International Application No. PCT/EP2020/056705 filed on Mar. 12, 2020, which designated the U.S. and claims priority to EP Patent Application No. 19163038.3 filed on Mar. 15, 2019.

The present invention relates to high-voltage components, especially for electromobility, comprising polymer compositions based on at least one polyester and 10,10'-oxybis-12H-phthaloperin-12-one, and to the use of 10,10'-oxybis-12H-phthaloperin-12-one for production of polyester-based products, with the proviso of a color difference ΔE<20 from the L*a*b* coordinates of a color number beginning with "2" in the RAL color chart, and to the use of 10,10'-oxybis-12H-phthaloperin-12-one for marking of polyester-based products as high-voltage components.

PRIOR ART

Technical thermoplastics such as polyesters are important materials, particularly also in the field of components for motor vehicles, due to their good mechanical stability, their chemicals resistance, very good electrical properties and good workability.

Polyesters have formed an important constituent for manufacturing demanding motor vehicle components for many years. While the internal combustion engine has been the dominant drive concept for many years, new demands with regard to choice of materials are also arising in the course of the search for alternative drive concepts. A significant role is played here by electromobility, where the internal combustion engine has been replaced partly (hybrid vehicle [HEV, PHEV, BEV Rex]) or completely (electromobile [BEV, FCEV]) by one or more electric motors which typically draw their electrical energy from batteries or fuel cells. While conventional vehicles having an internal combustion engine (ICE) as their sole means of propulsion typically make do with a 12-V onboard voltage system, hybrid and electric vehicles having electric motors as drive unit require significantly higher voltages. This poses a serious additional risk potential for the direct region and the immediate surroundings of such high-voltage parts, which plays an increasingly important role in technical specifications or else in standards. An important role is played here by the unambiguous marking of these dangerous regions in order thus to avoid unintentional contact with people (driver, mechanic etc.), with unambiguous color marking of such high-voltage assemblies in turn being particularly important.

For instance, at https://avt.inl.govisites/default/files/pdf/hev/hevtechspecrtpdf, the Advanced Vehicle Team of the Idaho National Laboratory for HEV (Hybrid Electric Vehicle) has published a technical specification with recommendations for all apparatuses subject to a high voltage of not less than 60 V including clear marking as "HIGH VOLTAGE", and in this connection also suggests the color orange for marking.

However, due to the high processing temperatures of in some cases >300° C. during compounding and during injection molding, the choice of suitable colorants for the color orange is very limited, especially for technical thermoplastics.

DE 10 2011 079114 A1 relates to an adhesive tape based on polyethylene terephthalate (PET) for sheathing cable sets and has for its object, for cable bundles marked with an orange color and subjected to a voltage of more than 60 volts, to ensure no significant color bleaching after a test duration of 3000 hours even at temperatures of 125° C. or 150° C. For this purpose, the polyester weave of the adhesive tape is colored orange with an anthraquinone-based dye. The examples specify that the dye is TERATOP Yellow HL-RS 200% Orange GL.

EP 0 827 986 A2 relates to bridged perinones, quinophthalones and perinone-quinophthalones as temperature-stable and light-resistant colorants for the bulk coloring of plastics. The examples show 10,10'-oxy-bis-12H-phthaloperin-12-one.

Finally DE 10 2016 124608 A1 relates inter alia to an orange-colored adhesive tape, preferably a cable wrapping tape, having a temperature class of at least T3 according to LV 312, having a textile carrier comprising at least one polymeric plastic material to which at least one adhesive layer has been applied on one side. Employed as the polymeric plastic material are aromatic, nitrogen-containing polymers from the group of polyoxadiazoles (POD), polybenzobisoxazoles (PBO) or polybenzimidazoles (PBI).

EP 0 041 274 B1 describes fluorescent compositions capable of altering the wavelengths of the light, molded articles based on such compositions as light wave-transforming elements, and apparatuses for converting optical energy to electrical energy using such an element. The examples of EP 0 041 274 B1 use 12H-phthaloperin-12-one inter alia in polyethylene terephthalate (PET).

12H-Phthaloperin-12-one [CAS No. 6925-69-5], known as Solvent Orange 60, is obtainable for example as Macrolex® Orange 3G from Lanxess Deutschland GmbH, Cologne. However, a disadvantage is that, under extreme demands, especially under the demands seen in electromobility, Solvent Orange 60 has a propensity to migrate out of the plastic matrix, which results in a decline in color intensity at elevated temperatures. The Solvent Orange 60 migrates to the surface of the plastic (blooming). From there it may be rubbed off, washed off or dissolved, may volatilize (fogging) or migrate into other materials (for example adjacent plastic or rubber parts) (bleeding). The concentration of the Solvent Orange 60 in the original plastic is reduced, thus causing a decline in color intensity. The migrated Solvent Orange 60 also has the disadvantage that it may be transported to adjacent components by mechanical or physical processes to cause performance impairment there. Examples include elevated electrical resistance in a switch contact which may result from deposition of Solvent Orange 60 on the surface of electrical contacts. In the field of electrical components, migration of ingredients from plastics is therefore generally unwanted since it can affect the properties of the plastics and of spatially adjacent parts, with the result that the function of the electrical component is no longer assured in some cases.

Proceeding from the teaching of EP 0 041 274 B1, the present invention accordingly had for its object to provide high-voltage components with the signal color orange such that the original color intensity achieved immediately after injection molding is retained over a longer period compared to 12H-phthaloperin-12-one. In respect of high-voltage components based on at least one polyester, these shall be less susceptible to migration, especially bleeding, compared to the solution in EP 0 041 274 B1. Ideally, orange polyester-based products of the invention, especially high-voltage components, should have improved lightfastness compared to products based on the prior art cited above, in that the original color achieved immediately after injection molding is retained under UV light over a longer period compared to 12H-phthaloperin-12-one-based components. Finally, improved thermal stability of the orange products of the invention, especially high-voltage components, under thermal stress compared to 12H-phthaloperin-12-one-based components is desirable. Ideally, in one embodiment, without laser absorber, orange high-voltage components of the invention should be laser-transparent/laser-transmitting for light wavelengths in the range from 800 nm to 1100 nm in order thus to allow the condition for transmission laser welding to another assembly absorbent in the recited wavelength range.

It has now been found that, surprisingly, high-voltage components, especially high-voltage components for electromobility, containing thermoplastic polymer compositions based on polyester and 10,10'-oxybis-12H-phthaloperin-12-one [CAS No. 203576-97-0] of formula (I) meet the requirements specified.

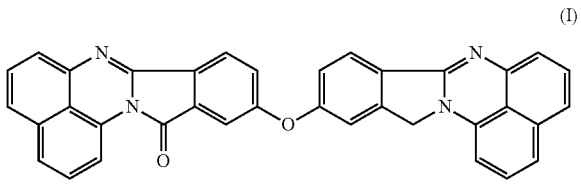 [SMILES: O=C1c2cc(Oc3ccc4c(c3)CN3C4=Nc4cccc5cccc3c45)ccc2C2=Nc3cccc4cccc(c34)N12]

(I)

Bleeding

In the context of the present invention, bleeding is ascertained as follows:

Plastic sheets having dimensions of 60·40·2 mm³ are first fabricated from a colorant-containing polyester composition to be examined. A plasticized PVC film having dimensions of 30·20·2 mm³ is subsequently placed between two of the initially fabricated plastic sheets and the entirety of all sheets is stored at 80° C. for 12 hours in a hot air drying cabinet. The colorant that has migrated from the two plastic sheets into the plasticized PVC is then assessed visually by the gray scale according to ISO 105-A02, with '5' meaning that the PVC film shows no color change (no visually discernible colorant transfer from the polyester plastic sheets to the PVC film) and '1' meaning that the PVC film shows a significant color change (significant visually discernible colorant transfer from the polyester plastic sheets to the PVC film).

Lightfastness

The measure of lightfastness used in the context of the present invention is discoloration after UV storage of above-described plastic sheets based on the colorant-containing polyester composition to be examined with UV light of the type from Suntest CPS+ with air-cooled Atlas Xenon lamp, 1500 watts, 45-130 klx, wavelength 300-800 nm and window glass filter 250-267 W/m² from Atlas Material Testing Technology GmbH, Linsengericht, Germany, and an irradiation time of 96 h. Discoloration is evaluated visually based on the blue wool scale according to DIN EN ISO 105-B02, with '8' representing exceptional lightfastness (little color change) and '1' representing very low lightfastness (significant color change).

Subject Matter of the Invention

The invention provides high-voltage components, especially high-voltage components for electromobility, comprising at least one polyester and 10,10'-oxybis-12H-phthaloperin-12-one. Preference is given to high-voltage components in which the polyester used is a $C_2$-$C_{10}$-polyalkylene terephthalate or a polycarbonate.

However, the present invention also relates to the use of 10,10'-oxybis-12H-phthaloperin-12-one for marking polyester-based high-voltage components, preferably high-voltage components for electromobility, with the signal color orange. In the use, polyesters used are preferably $C_2$-$C_{10}$-polyalkylene terephthalates or a polycarbonate.

The present invention also further relates to the use of 10,10'-oxybis-12H-phthaloperin-12-one for production of polyester-based high-voltage components, especially high-voltage components for electromobility, with the proviso of a color difference ΔE<20 from the L*a*b* coordinates of a color number beginning with "2" in the RAL color chart, preferably a ΔE<10, more preferably a ΔE<5, and a laser transparency of at least 5%. In this use, polyesters used are preferably $C_2$-$C_{10}$-polyalkylene terephthalates or polycarbonates.

The invention also provides high-voltage components, especially high-voltage components for electromobility, based on polymer compositions comprising, per 100 parts by mass of at least one polyester, 0.01 to 5 parts by mass, more preferably 0.01 to 3 parts by mass, of 10,10'-oxybis-12H-phthaloperin-12-one, with the proviso of a color difference ΔE<20 from the L*a*b* coordinates of a color number beginning with "2" in the RAL color chart, preferably a ΔE<10, more preferably a ΔE<5, and a laser transparency of at least 5%. For high-voltage components of the invention, polyesters used are preferably $C_2$-$C_{10}$-polyalkylene terephthalates or polycarbonates.

Finally, the invention relates to the use of 10,10'-oxybis-12H-phthaloperin-12-one for marking of polyester-based products as high-voltage components, wherein polyesters used are preferably $C_2$-$C_{10}$-polyalkylene terephthalates or polycarbonates.

Polyester compositions for the production of high-voltage components of the invention are formulated by mixing components A) and B) to be used as reactants in at least one mixing tool. This affords, as intermediates, molding compounds based on the polyester compositions of the invention. These molding compounds may either consist exclusively of components A) and B) or else may contain at least one further component in addition to the components A) and B).

By way of clarification, it should be noted that the scope of the present invention encompasses all the definitions and parameters mentioned hereinafter in general terms or specified within areas of preference, in any desired combinations. The standards recited in the context of this application relate to the edition current at the filing date of the present invention.

High Voltage

Regulation no. 100 of the United Nations Economic Commission for Europe (UNECE)—Uniform provisions concerning the approval of vehicles with regard to the specific requirements for the electric powertrain [2015/505], paragraph 2.17, describes the term "high voltage" as the classification of an electric component or circuit, if its working voltage is >60 V and ≤1500 V (direct current) or >30 V and ≤1000 V (alternating current) root mean square (rms).

This classification of "high voltage" corresponds to voltage class B of ISO6469-3:2018 ("Electrically propelled road vehicles—Safety specifications—Part 3: Electrical safety"). Section 5.2 thereof also includes marking requirements for electrical components of voltage class B through appropriate hazard symbols or the color 'orange'.

High-Voltage Components and High-Voltage Components for Electromobility

According to the invention, "high-voltage component" is understood to mean components or products subjected to an operating voltage according to section 2.17 of the above-mentioned Regulation no. 100 of the United Nations Economic Commission for Europe (UNECE). According to the invention, "high-voltage components for electromobility" preferably refer to components in electric vehicles subjected to an operating voltage of not less than 30 V (direct current) or not less than 20 V (alternating current), more preferably—as per voltage class B of ISO6469-3:2018—an operating voltage of greater than 60 V direct current or more than 30 V alternating current.

According to the invention, high-voltage components for electromobility include not only such components in direct contact with the voltage-conducting parts but also those that directly adjacent thereto or in spatial proximity thereto act as a touch guard, a warning marking or a shielding means, wherein components in direct contact with the voltage-conducting parts are preferred according to the invention.

Inventive high-voltage components for electromobility are preferably colored orange, with particular preference for shades corresponding in the RAL color system to color numbers RAL2003, RAL2004, RAL2007, RAL2008, RAL2009, RAL2010 and RAL2011, and very particular preference for the shades corresponding in the RAL color system to the color numbers RAL2003, RAL2008, RAL2009 and RAL2011, and with especial preference for RAL2003.

"Similar shades" permissible in accordance with the invention are shades whose color difference in the L*a*b* system has a ΔE of <20, preferably a ΔE<10, more preferably a ΔE<5, from a color number beginning with "2" in the RAL color chart. For elucidation of ΔE defined in EN ISO 11664-4 see, for example:
https://de.wikipedia.org/wiki/Delta_E.

In one embodiment of the present invention, the inventive high-voltage components for electromobility are designed by addition of further components such that they are absorbent for laser light having a wavelength in the range from 800 nm to 1100 nm, such that combination of one laser-transparent configuration and one laser-absorbing configuration confers laser weldability.

Orange

In the context of the present invention, orange is considered to mean a color which, in the RAL color system according to https://de.wikipedia.org/wiki/RAL-Farbe#Orange, has a color number beginning with "2" in the RAL color chart. In particular, at the filing date of the present invention, a distinction is made between the orange shades according to tab. 1:

TABLE 1

|  |  | L* | a* | b* |
| --- | --- | --- | --- | --- |
| RAL 2000 | Yellow orange | 58.20 | 37.30 | 68.68 |
| RAL 2001 | Red orange | 49.41 | 39.79 | 35.29 |
| RAL 2002 | Blood orange | 47.74 | 47.87 | 33.73 |
| RAL 2003 | Pastel orange | 66.02 | 41.22 | 52.36 |
| RAL 2004 | Pure orange | 56.89 | 50.34 | 49.81 |
| RAL 2005 | Luminous orange | 72.27 | 87.78 | 82.31 |
| RAL 2007 | Luminous bright orange | 76.86 | 47.87 | 97.63 |
| RAL 2008 | Bright red orange | 60.33 | 46.91 | 60.52 |
| RAL 2009 | Traffic orange | 55.83 | 47.79 | 48.83 |
| RAL 2010 | Signal orange | 55.39 | 40.10 | 42.42 |
| RAL 2011 | Deep orange | 59.24 | 40.86 | 64.50 |
| RAL 2012 | Salmon orange | 57.75 | 40.28 | 30.66 |
| RAL 2013 | Pearl orange | 40.73 | 32.14 | 34.92 |

Table 1 shows the apparatus-independent CIE L*a*b* color values for the respective RAL value: L* stands for luminance, a*=D65 and b*=10°. The color model is standardized in EN ISO 11664-4 "Colorimetry—Part 4: CIE 1976 L*a*b* Colour space". For L*a*b* color space (also: CIELAB) see: https://de.wikipedia.org/wiki/Lab-Farbraum. Each color in the color space is defined by a color locus having the Cartesian coordinates {L*, a*, b*}. The a*b* coordinate plane was constructed using opponent color theory. Green and red are at opposite ends of the a* axis from one another and the b* axis runs from blue to yellow. Complementary shades are respectively opposite one another at a 180° angle; the midpoint between them (the coordinate origin a*=0, b*=0) is gray.

The L* axis describes the brightness (luminance) of the color with values of 0 to 100. In the diagram it stands perpendicular to the a*b* plane at the origin. It may also be referred to as the neutral gray axis since all non-colored shades (gray shades) are contained between the endpoints of black (L*=0) and white (L*=100). The a* axis describes the green or red fraction of a color, with negative values representing green and positive values representing red. The b* axis describes the blue or yellow fraction of a color, with negative values representing blue and positive values representing yellow.

The a* values range from approximately −170 to +100 and the b* values from −100 to +150, with the maximum values being achieved only at moderate brightness of certain shades. The CIELAB color solid has its greatest extent in the region of moderate brightness, although this differs in height and size depending on the color range.

The invention encompasses orange-like shades that have a color difference ΔE<20 between the L*a*b* coordinates of the polymer composition and the L*a*b* coordinates of a color number beginning with "2" in the RAL color chart, preferably a ΔE<10, more preferably a ΔE<5.

Transmission Laser Welding

A further technical field of use for amorphous and semicrystalline polyesters is transmission laser welding, also known as laser transmission welding or laser welding for short. Transmission laser welding of plastics is based on radiation absorption in the molding compound. This is a joining process in which two joining partners generally made of thermoplastics are joined to one another on a molecular level. To this end, one joining partner has a high transmission coefficient and the other a high absorption coefficient in the range of the laser wavelength used. The joining partner having the high transmission coefficient is irradiated by the laser beam substantially without heating. Upon contact with the joining partner having the high absorption coefficient, the incident laser energy is absorbed in a near-surface manner, thus converting it into heat energy and melting the plastic. Owing to heat conduction processes the laser-transparent joining partner is also plasticized in the region of the joining zone. Customary laser sources used in laser transmission welding emit radiation in a wavelength range of approximately 600 to 1200 nm. High output diode lasers (HDL, λ=800-1100 nm) and solid-state lasers (for example Nd:YAG lasers, λ=1060-1090 nm) in particular are commonly used. Many non-additized polymers are largely transparent or translucent to laser radiation, i.e. they absorb only poorly. Suitable colorants, but also further additives, such as fillers and reinforcers make it possible to control the absorption and thus the conversion of laser light into heat. Often added to the absorbent joining partner are absorbent pigments, which in the case of laser-absorbing joining partners are usually carbon black pigments. This approach is not possible for the laser-transparent joining partner since polymers colored with carbon black for example show insufficient transmission for the laser light. The same applies to many organic dyes, for example nigrosin. There is therefore a need for moldings which despite their coloring show a sufficient transmission for the laser light so that they may be used as the laser-transparent component in transmission laser welding.

The fundamental principles of transmission laser welding are known to those skilled in the art from Kunststoffe 87 (1997) 3, 348-350, Kunststoffe 87 (1997) 11, 1632-1640, Kunststoffe 88 (1998) 2, 210-121, Plastverarbeiter 46 (1995) 9, 42-46 and Plastverarbeiter 50 (1999) 4 18-19. The transmittance of a polymer molding for laser light having a wavelength of 600 to 1200 nm may be measured for example with a spectrophotometer and an integrating photometer sphere. This setup also makes it possible to determine the diffuse fraction of the transmitted radiation. Suitable laser sources for laser transmission welding emit radiation in the abovementioned wavelength range of about 600 to 1200 nm and the abovementioned high output diode lasers or solid state lasers are used. With regard to the production of moldings for laser transmission welding or polyester-based polymer compositions to be used for this purpose, reference is made in full to the details that follow in that, for production of a laser-transparent molding, essentially no components absorbing in the wavelength range of the laser used for the transmission laser welding are used. This applies especially when at least one of components C) fillers and reinforcers, D) flame retardants or E) additives are added to the composition for the laser-transparent molding. Preferably, for production of the laser-transparent molding, no further additives that absorb or scatter in the wavelength range of relevance in the laser process are used in addition to component B) to be used in accordance with the invention.

Production of polyester compositions for producing moldings for use for transmission laser welding is effected by processes known per se. These typically comprise first mixing the components in the relevant mass fractions. The mixing of components is preferably accomplished by conjoint blending, mixing, kneading, extruding or rolling at elevated temperatures. The temperature during mixing is preferably in a range from 220° C. to 340° C., more preferably in a range from 260° C. to 320° C. and especially in a range from 280° C. to 300° C. It may be advantageous to premix individual components. It is further also possible to directly produce the moldings from a physical mixture produced markedly below the melting temperature of the respective polyester (dryblend) of premixed components and/or individual components. The temperature during mixing of dryblends is preferably in a range from 0° C. to 100° C., more preferably in a range from 10° C. to 50° C., especially at ambient temperature (25° C.+/−3° C.). The molding compounds may be processed to give moldings by customary processes, preferably by injection molding or extrusion.

At the time of writing there is no standard on the basis of which a measurement of laser transparency must be carried out. A person skilled in the art accordingly makes the measurement as follows: laser transparency is measured at 5 defined measuring sites on each of 5 sheets having dimensions of 60 mm-60 mm-2 mm and a highly polished surface. These values are used to calculate the average laser transparency. To this end, the sheets are packaged in barrier PE bags (PE=polyethylene) before measurement and tested in the analyzer in the dry-as-molded state after 24 hours. See: K. D. Feddersen "Laserdurchstrahlschweißen—die Lösung für nicht lösbare Verbindungen" [Laser Transmission Welding—the Solution for Unpartable Bonds], Österreichische Kunststoffzeitschrift 1/2 2018, pages 50-52. What is meant in the context of the invention by the dry-as-molded state is that, immediately after the injection molding, the specimens to be examined in the present invention are stored at 23±2° C. and a relative humidity of 50±10% for at least 16 hours and until performance of the respective study. With regard to the determination of water content, reference is made to ISO 15512:2009-10.

Transparency of the specimens analyzed in the context of the present application was measured in the near IR (NIR) at a laser wavelength of 980 nm in accordance with DVS-Richtlinie [German Welding Society information sheet] 2243 (January 2014) "Laserstrahlschweißen thermoplastischer Kunststoffe" [Laser Beam Welding of Thermoplastics] using plaques having dimensions of 60 mm·60 mm·2 mm with the LPKF TMG3 transmittance analyzer from LPKF Laser & Electronics AG, Garbsen, Germany, calibrated beforehand with an analytical standard generated according to DIN EN ISO/IEC 17025; see: LPKF AG 101016-DE: "Einfache Transmissionsmessung für Kunststoffe LPKF TMG3" [Simple Transmittance Measurement for Plastics LPKF TMG3].

According to the invention, the polyester composition comprising component B) or the polyester-based high-voltage component comprising component B) is considered to have laser transparency or else laser transmittance when laser transmittance measured by the above-described method of the composition or high-voltage component comprising component B) corresponds to at least 80% of that of a corresponding polymer composition or high-voltage component lacking component B). In the context of the present invention, "laser-absorbing" is understood to mean that transmittance of the plaques of thickness 2 mm is less than 0.5% by the abovementioned method.

Further Preferred Embodiments of the Invention

In a preferred embodiment, the invention relates to high-voltage components, especially high-voltage components for electromobility, comprising thermoplastic polymer compositions comprising, in addition to components A) and B), also C) at least one filler and/or reinforcer, preferably in an amount of 1 to 150 parts by mass, more preferably 5 to 80 parts by mass, most preferably 10 to 50 parts by mass, based in each case on 100 parts by mass of component A), with the proviso of a color difference ΔE<20 from the L*a*b* coordinates of a color number beginning with "2" in the RAL color chart and a laser transparency of at least 5%.

In a further preferred embodiment, the invention relates to high-voltage components, especially high-voltage components for electromobility, comprising thermoplastic polymer compositions comprising, in addition to components A) to C) or instead of C), also D) at least one flame retardant, preferably in an amount of 3 to 100 parts by mass, more preferably 5 to 80 parts by mass, most preferably 10 to 50 parts by mass, based in each case on 100 parts by mass of component A), with the proviso of a color difference ΔE<20 from the L*a*b* coordinates of a color number beginning with "2" in the RAL color chart and a laser transparency of at least 5%.

In a further preferred embodiment, the invention relates to high-voltage components, especially high-voltage components for electromobility, comprising thermoplastic polymer compositions comprising, in addition to components A) to E) or instead of C) and/or D), also E) at least one further additive other than components B) to D), preferably in an amount of 0.01 to 80 parts by mass, more preferably 0.05 to 50 parts by mass, most preferably 0.1 to 30 parts by mass, based in each case on 100 parts by mass of component A), with the proviso of a color difference ΔE<20 from the L*a*b* coordinates of a color number beginning with "2" in the RAL color chart and a laser transparency of at least 5%.

$C_2$-$C_{10}$-Polyalkylene Terephthalates as Component A)

$C_2$-$C_{10}$-Polyalkylene terephthalates to be used with preference in accordance with the invention as component A) are reaction products of an alcohol moiety having 2 to 10 carbon atoms in the alcohol moiety and terephthalic acid. $C_2$-$C_{10}$-Polyalkylene terephthalates are known to those skilled in the art and extensively described in the literature. They contain an aromatic ring in the main chain which derives from the terephthalic acid and an aliphatic moiety which derives from a dihydroxy compound. The aromatic ring of the terephthalic acid may also be substituted. Preferred substituents are halogens or $C_1$-$C_4$-alkyl groups. Preferred halogens are chlorine or bromine. Preferred $C_1$-$C_4$-alkyl groups are methyl, ethyl, n-propyl or n-, i- or t-butyl groups.

$C_2$-$C_{10}$-Polyalkylene terephthalates preferred for use as component A) are obtainable by reaction of aromatic dicarboxylic acids, their esters or other ester-forming derivatives with aliphatic dihydroxy compounds in a manner known to those skilled in the art.

In the case of the $C_2$-$C_{10}$-polyalkylene terephthalates for use as component A), a portion of the terephthalic acid to be used for the preparation thereof, up to 30 mol %, may be replaced by naphthalene-2,6-dicarboxylic acid or isophthalic acid or mixtures thereof. Up to 70 mol %, preferably not more than 10 mol %, of the terephthalic acid may be replaced by aliphatic or cycloaliphatic dicarboxylic acids such as adipic acid, azelaic acid, sebacic acid, dodecanedioic acids and cyclohexanedicarboxylic acids.

Among the aliphatic dihydroxy compounds, preference is given to diols having 2 to 6 carbon atoms, especially ethane-1,2-diol, propane-1,3-diol, butane-1,4-diol, hexane-1,6-diol, hexane-1,4-diol, cyclohexane-1,4-diol, cyclohexane-1,4-dimethanol and neopentyl glycol or mixtures thereof. Particularly preferred polyalkylene terephthalates derive from alkanediols having 2 to 4 carbon atoms. Among these, preference is given especially to polyethylene terephthalate, polypropylene terephthalate and polybutylene terephthalate or mixtures thereof. Also preferred are PET and/or PBT which contain up to 1% by weight, preferably up to 0.75% by weight, of hexane-1,6-diol and/or 2-methylpentane-1,5-diol as further monomer units.

It is preferable when $C_2$-$C_{10}$-polyalkylene terephthalates for use as component A) have a viscosity number m to be determined according to ISO 1628 in the range from 50 to 220, preferably in the range from 80 to 160, by measurement in a 0.5% by weight solution in a 1:1 by weight phenol/o-dichlorobenzene mixture at 25° C.

$C_2$-$C_{10}$-Polyalkylene terephthalates to be used with preference in accordance with the invention as component A) preferably have a carboxyl end group content of up to 100 meq/kg polyester, more preferably of up to 50 meq/kg polyester and especially preferably of up to 40 meq/kg polyester. Such $C_2$-$C_{10}$-polyalkylene terephthalates may be produced for example by the process according to DE-A 44 01 055. The carboxyl end group content is typically determined by titration processes, especially potentiometry.

Especially preferred $C_2$-$C_{10}$-polyalkylene terephthalates for use as component A) are produced with Ti catalysts. After polymerization these preferably have a residual Ti content of 250 ppm, more preferably of <200 ppm, most preferably of <150 ppm.

The polybutylene terephthalate (PBT) [CAS No. 24968-12-5] to be used with preference in accordance with the invention as component A) is prepared from terephthalic acid or the reactive derivatives thereof and butanediol by known methods (Kunststoff-Handbuch [Plastics Handbook], vol. VIII, p. 695-743, Karl Hanser Verlag, Munich 1973).

The PBT for use as component A) preferably contains at least 80 mol %, preferably at least 90 mol %, based on the dicarboxylic acid, of terephthalic acid radicals.

PBT for use with preference in accordance with the invention as component A) may, in addition to terephthalic acid radicals, contain up to 20 mol % of radicals of other aromatic dicarboxylic acids having 8 to 14 carbon atoms or radicals of aliphatic dicarboxylic acids having 4 to 12 carbon atoms, especially radicals of phthalic acid, isophthalic acid, naphthalene-2,6-dicarboxylic acid, 4,4'-diphenyldicarboxylic acid, succinic acid, adipic acid, sebacic acid, azelaic acid, cyclohexanediacetic acid, cyclohexanedicarboxylic acid, 2,5-furandicarboxylic acid.

PBT for use with preference in accordance with the invention as component A) may, in addition to butanediol, contain up to 20 mol % of other aliphatic diols having 3 to 12 carbon atoms or up to 20 mol % of cycloaliphatic diols having 6 to 21 carbon atoms, preferably radicals of propane-1,3-diol, 2-ethylpropane-1,3-diol, neopentyl glycol, pentane-1,5-diol, hexane-1,6-diol, 1,4-cyclohexanedimethanol, 3-methylpentane-2,4-diol, 2-methylpentane-2,4-diol, 2,2,4-trimethylpentane-1,3-diol, 2,2,4-trimethylpentane-1,5-diol, 2-ethylhexane-1,3-diol, 2,2-diethylpropane-1,3-diol, hexane-2,5-diol, 1,4-di(β-hydroxyethoxy)benzene, 2,2-bis(4-hydroxycyclohexyl)propane, 2,4-dihydroxy-1,1,3,3-tetramethylcyclobutane, 2,2-bis(3-β-hydroxyethoxyphenyl)propane and 2,2-bis(4-hydroxypropoxyphenyl)propane.

PBT to be used with preference as component A) has an intrinsic viscosity according to EN-ISO 1628/5 in the range from 40 to 170 cm$^3$/g, more preferably in the range from 50 to 150 cm$^3$/g, most preferably in the range from 65 to 135 cm$^3$/g, in each case measured in phenol/o-dichlorobenzene (1:1 parts by weight) at 25° C. in an Ubbelohde viscometer. Intrinsic viscosity IV, also referred to as Staudinger Index or limiting viscosity, is proportional, according to the Mark-Houwink equation, to the average molecular mass, and is the extrapolation of the viscosity number VN for the case of vanishing polymer concentrations. It can be estimated from series of measurements or through the use of suitable approximation methods (e.g. Billmeyer). VN [ml/g] is obtained from the measurement of the solution viscosity in a capillary viscometer, for example an Ubbelohde viscometer. Solution viscosity is a measure of the average molecular weight of a plastic. The determination is effected on dissolved polymer, with various solvents (m-cresol, tetrachloroethane, phenol, 1,2-dichlorobenzene, etc.) and concentrations being used. The viscosity number VN makes it possible to monitor the processing and performance characteristics of plastics. A thermal load on the polymer, ageing processes or exposure to chemicals, weathering and light can be investigated by means of comparative measurements. In this connection see also: http://de.wikipedia.org/wiki/Viskosimetrie and "http://de.wikipedia.org/wiki/Mark-Houwink-Gleichung".

PBT to be used with preference as component A) may also be used in a mixture with other polymers. The production of PBT blends for use in accordance with the invention is effected by compounding. During such a compounding operation, customary additives, especially mold release agents or elastomers, may additionally be added to the melt to improve the properties of the blends.

PBT preferred for use in accordance with the invention is available from Lanxess Deutschland GmbH, Cologne under the name Pocan® B 1300.

Polycarbonate as Component A)

According to the invention, the polyester used for component A) may also be at least one thermoplastic from the group of polycarbonates.

Polycarbonates preferred for use in accordance with the invention are homopolycarbonates or copolycarbonates based on bisphenols of the general formula (I)

HO—Z—OH (I)

in which Z represents a divalent organic radical which has 6 to 30 carbon atoms and contains one or more aromatic groups.

Preference is given to using, as component A), at least one polycarbonate based on bisphenols of the formula (Ia)

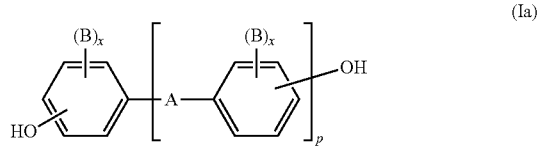

in which
A is a single bond or a radical from the group of $C_1$-$C_5$-alkylene, $C_2$-$C_5$-alkylidene, $C_5$-$C_6$-cycloalkylidene, —O—, —SO—, —CO—, —S—, —SO$_2$—, $C_6$-$C_{12}$-arylene to which further aromatic, optionally heteroatom-containing, rings may be fused,
or A is a radical of the formula (II) or (III)

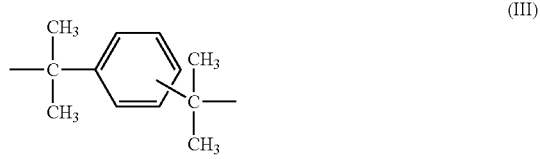

in which
$R^7$ and $R^8$ can be chosen individually for each Y and are independently hydrogen or $C_1$-$C_6$-alkyl, preferably hydrogen, methyl or ethyl,
B in each case is $C_1$-$C_{12}$-alkyl, preferably methyl, halogen, preferably chlorine and/or bromine,
x in each case is independently 0, 1 or 2,
p is 1 or 0,
Y is carbon, and
m is an integer from 4 to 7, preferably 4 or 5, with the proviso that $R^7$ and $R^8$ on at least one Y (carbon atom) are both alkyl.

In a preferred embodiment:
when m is 4, Y is —$CR^7R^8$—$CR^7R^8$—$CR^7R^8$—$CR^7R^8$—;
when m is 5, Y is —$CR^7R^8$—$CR^7R^8$—$CR^7R^8$—$CR^7R^8$—$CR^7R^8$—;
when m is 6, Y is —$CR^7R^8$—$CR^7R^8$—$CR^7R^8$—$CR^7R^8$—$CR^7R^8$—$CR^7R^8$—; and
when m is 7, Y is —$CR^7R^8$—$CR^7R^8$—$CR^7R^8$—$CR^7R^8$—$CR^7R^8$—$CR^7R^8$—$CR^7R^8$—.

Preferred bisphenols containing the general formula (II) are bisphenols from the group of dihydroxydiphenyls, bis(hydroxyphenyl)alkanes, bis(hydroxyphenyl)cycloalkanes, indanebisphenols, bis(hydroxyphenyl) sulfides, bis(hydroxyphenyl) ethers, bis(hydroxyphenyl) ketones, bis(hydroxyphenyl) sulfones, bis(hydroxyphenyl) sulfoxides and α,α'-bis(hydroxyphenyl)diisopropylbenzenes.

Derivatives of the bisphenols recited that are preferably obtainable by alkylation or halogenation at the aromatic rings of the bisphenols recited are also bisphenols containing the general formula (II) that are to be used with preference.

Particularly preferred bisphenols containing the general formula (II) are hydroquinone, resorcinol, 4,4'-dihydroxydiphenyl, bis(4-hydroxyphenyl) sulfide, bis(4-hydroxyphenyl) sulfone, bis(3,5-dimethyl-4-hydroxyphenyl)methane, bis(3,5-dimethyl-4-hydroxyphenyl) sulfone, 1,1-bis(3,5-dimethyl-4-hydroxyphenyl)-p/m-diisopropylbenzene, 1,1-bis(4-hydroxyphenyl)-1-phenylethane, 1,1-bis(3,5-dimethyl-4-hydroxyphenyl)cyclohexane, 1,1-bis(4-hydroxyphenyl)-3-methylcyclohexane, 1,1-bis(4-hydroxyphenyl)-3,3-dimethylcyclohexane, 1,1-bis(4-hydroxyphenyl)-4-methylcyclohexane, 1,1-bis(4-hydroxyphenyl)cyclohexane, 1,1-bis(4-hydroxyphenyl)-3,3,5-trimethylcyclohexane, 2,2-bis(3,5-dichloro-4-hydroxyphenyl)propane, 2,2-bis(3-methyl-4-hydroxyphenyl)propane, 2,2-bis(3,5-dimethyl-4-hydroxyphenyl)propane, 2,2-bis(4-hydroxyphenyl)propane (i.e. bisphenol A), 2,2-bis(3-chloro-4-hydroxyphenyl)propane, 2,2-bis(3,5-dibromo-4-hydroxyphenyl)propane, 2,4-bis(4-hydroxyphenyl)-2-methylbutane, 2,4-bis(3,5-dimethyl-4-hydroxyphenyl)-2-methylbutane, α,α'-bis(4-hydroxyphenyl)-o-diisopropylbenzene, α,α'-bis(4-hydroxyphenyl)-m-diisopropylbenzene (i.e. bisphenol M), α,α'-bis(4-hydroxyphenyl)-p-diisopropylbenzene and indanebisphenol.

The described bisphenols of the general formula (II) can be prepared by processes known to those skilled in the art, preferably from the corresponding phenols and ketones.

The polycarbonates for use as component A) can also be prepared by known processes. Preferred processes for preparing polycarbonates are, for example, preparation from bisphenols with phosgene by the interfacial process, or from bisphenols with phosgene by the process in homogeneous phase, called the pyridine process, or from bisphenols with carbonic esters by the melt transesterification process. The recited bisphenols and processes for their production are described, for example, in the monograph H. Schnell, "Chemistry and Physics of Polycarbonates", Polymer Reviews, Volume 9, p. 77-98, Interscience Publishers, New York, London, Sydney, 1964 and in U.S. Pat. No. 3,028,635, in U.S. Pat. No. 3,062,781, in U.S. Pat. No. 2,999,835, in U.S. Pat. No. 3,148,172, in U.S. Pat. No. 2,991,273, in U.S. Pat. No. 3,271,367, in U.S. Pat. No. 4,982,014, in U.S. Pat. No. 2,999,846, in DE-A 1 570 703, in DE-A 2 063 050, in DE-A 2 036 052, in DE-A 2 211 956, in DE-A 3 832 396, and in FR-A 1 561 518, and also in Japanese laid-open specifications having application numbers JP-A 62039 1986, JP-A 62040 1986 and JP-A 105550 1986.

1,1-Bis(4-hydroxyphenyl)-3,3,5-trimethylcyclohexane and the preparation thereof is described, for example, in U.S. Pat. No. 4,982,014.

Indanebisphenols and the preparation thereof are described, for example, in U.S. Pat. No. 3,288,864, in JP-A 60 035 150 and in U.S. Pat. No. 4,334,106. Indanebisphenols can be prepared, for example, from isopropenylphenol or derivatives thereof or from dimers of isopropenylphenol or derivatives thereof in the presence of a Friedel-Craft catalyst in organic solvents.

The melt transesterification process is described in H. Schnell, "Chemistry and Physics of Polycarbonates", Polymer Reviews, Volume 9, pages 44 to 51, Interscience Publishers, New York, London, Sydney, 1964 and in DE-A 1 031 512.

In the preparation of polycarbonate, preference is given to using raw materials and auxiliaries having a low level of impurities. Especially in the case of preparation by the melt transesterification process, the bisphenols used and the carbonic acid derivatives used are ideally to be very substantially free of alkali metal ions and alkaline earth metal ions. Raw materials having such a degree of purity are obtainable, for example, by recrystallizing, washing or distilling the carbonic acid derivatives, especially carbonic esters, and the bisphenols.

Polycarbonates for use with preference as component A) in accordance with the invention preferably have a weight-average molar mass $M_w$ in the range from 10 000 to 200 000 g/mol, which can be determined by ultracentrifugation (see K. Schilling, Analytische Ultrazentrifugation, Nanolytics GmbH, Dallgow, pages 1-15) or scattered light measurement according to DIN EN ISO 16014-5:2012-10. More preferably, the polycarbonates to be used have a weight-average molar mass in the range from 12 000 to 80 000 g/mol, especially preferably a weight-average molar mass in the range from 20 000 to 35 000 g/mol.

The average molar mass of polycarbonates for use with preference in accordance with the invention as component A) may preferably be adjusted in a known manner via an appropriate amount of chain terminators. The chain terminators may be used individually or as a mixture of different chain terminators.

Preferred chain terminators are both monophenols and monocarboxylic acids. Preferred monophenols are phenol, p-chlorophenol, p-tert-butylphenol, cumylphenol or 2,4,6-tribromophenol, and long-chain alkylphenols, especially 4-(1,1,3,3-tetramethylbutyl)phenol or monoalkylphenols or dialkylphenols having a total of 8 to 20 carbon atoms in the alkyl substituents, especially 3,5-di-tert-butylphenol, p-tert-octylphenol, p-dodecylphenol, 2-(3,5-dimethylheptyl)phenol or 4-(3,5-dimethylheptyl)phenol. Preferred monocarboxylic acids are benzoic acid, alkylbenzoic acids or halobenzoic acid.

Particularly preferred chain terminators are phenol, p-tert-butylphenol, 4-(1,1,3,3-tetramethylbutyl)phenol or cumylphenol.

The amount of chain terminators to be used is preferably in the range from 0.25 to 10 mol % based on the sum total of the bisphenols used in each case.

Polycarbonates for use with preference in accordance with the invention as component A) may be branched in known fashion, preferably by the incorporation of branching agents that are trifunctional or more than trifunctional. Preferred branching agents have three or more than three phenolic groups or three or more than three carboxylic acid groups.

Particularly preferred branching agents are phloroglucinol, 4,6-dimethyl-2,4,6-tri(4-hydroxyphenyl)hept-2-ene, 4,6-dimethyl-2,4,6-tri(4-hydroxyphenyl)heptane, 1,3,5-tri(4-hydroxyphenyl)benzene, 1,1,1-tris-(4-hydroxyphenyl)ethane, tri(4-hydroxyphenyl)phenylmethane, 2,2-bis[4,4-bis(4-hydroxyphenyl)cyclohexyl]propane, 2,4-bis(4-hydroxyphenylisopropyl)phenol, 2,6-bis(2-hydroxy-5'-methylbenzyl)-4-methylphenol, 2-(4-hydroxyphenyl)-2-(2,4-dihydroxyphenyl)propane, hexa(4-(4-hydroxyphenyl isopropyl)phenyl) terephthalate, tetra(4-hydroxyphenyl) methane, tetra(4-(4-hydroxyphenylisopropyl)phenoxy) methane and 1,4-bis(4',4''-dihydroxytriphenyl)methylbenzene, 2,4-dihydroxybenzoic acid, trimesic acid, cyanuric chloride, 3,3-bis(3-methyl-4-hydroxyphenyl)-2-oxo-2,3-dihydroindole, trimesyl trichloride or $\alpha,\alpha',\alpha''$-tris-(4-hydroxyphenol)-1,3,5-triisopropylbenzene.

Very particularly preferred branching agents are 1,1,1-tris(4-hydroxyphenyl)ethane or 3,3-bis(3-methyl-4-hydroxyphenyl)-2-oxo-2,3-dihydroindole.

The amount of branching agents to be used is preferably in the range from 0.05 mol % to 2 mol % based on the moles of bisphenols used.

When a polycarbonate is prepared by the interfacial process, the branching agents are preferably included in an initially charged aqueous alkaline phase with the bisphenols and the chain terminators or added together with the carbonic acid derivatives as a solution in an organic solvent. If the transesterification process is used, the branching agents are preferably metered in together with the dihydroxyaromatics or bisphenols.

Catalysts to be used with preference in the preparation of polycarbonates to be used with preference in accordance with the invention as component A) by the melt transesterification process are ammonium salts and phosphonium salts, as described, for example, in U.S. Pat. No. 3,442,864, JP-A-14742/72, U.S. Pat. No. 5,399,659 or DE-A 19 539 290.

In a preferred embodiment, copolycarbonates may also be used as component A). In the context of the invention, copolycarbonates are especially polydiorganosiloxane-polycarbonate block copolymers having a weight-average molar mass $M_w$ preferably in the range from 10 000 to 200 000 g/mol, more preferably in the range from 20 000 to 80 000 g/mol, determined by gel chromatography to DIN EN ISO 16014-5:2012-10 after prior calibration by scattered light measurement or ultracentrifugation. The content of aromatic carbonate structural units in the polydiorganosiloxane-polycarbonate block copolymers is preferably in the range from 75% to 97.5% by weight, more preferably in the range from 85% to 97% by weight. The content of polydiorganosiloxane structural units in the polydiorganosiloxane-polycarbonate block copolymers is preferably in the range from 25% to 2.5% by weight, more preferably in the range from 15% to 3% by weight. The polydiorganosiloxane-polycarbonate block copolymers can preferably be prepared proceeding from polydiorganosiloxanes containing $\alpha,\omega$-bishydroxyaryloxy end groups and having an average degree of polymerization $P_n$ in the range from 5 to 100, more preferably having an average degree of polymerization $P_n$ in the range from 20 to 80.

Polycarbonates for use with particular preference as component A) are the homopolycarbonate based on bisphenol A, the homopolycarbonate based on 1,1-bis(4-hydroxyphenyl)-3,3,5-trimethylcyclohexane and the copolycarbonates based on the two monomers bisphenol A and 1,1-bis(4-hydroxyphenyl)-3,3,5-trimethylcyclohexane (=bisphenol TMC). Polycarbonates preferred in accordance with the invention for use as component A) are obtainable, for example, under the Makrolon® brand from Covestro AG, Leverkusen.

In one embodiment, the polycarbonates for use as component A) may have customary additives, especially demolding agents, added thereto in the melt or applied to the surface. The polycarbonates for use as component A) preferably already contain demolding agents before subsequent compounding with the other components, where the person skilled in the art understands compounding to mean the plastics industry term, synonymous with plastics processing, which describes the process of finishing plastics by addition of admixtures (fillers, additives etc.) for controlled optimization of the profiles of properties. Compounding is preferably effected in extruders, more preferably in co-rotating twin-screw extruders, counter-rotating twin-screw extruders, planetary screw extruders or co-compounders and comprises the process operations of conveying, melting, dispersing, mixing, degassing and pressure build-up.

However, in a preferred embodiment, it is also possible to use blends of polycarbonate and polyalkylene terephthalates as component A), which are likewise marketed by Covestro AG under the Makroblend® brand. These are preferably PC-PET blends, PC-PBT blends or PC-PCT-G blends, where PC stands for polycarbonate, PET for polyethylene terephthalate, PBT for polybutylene terephthalate and PCT for polycyclohexylene dimethylene terephthalate.

Preference is therefore given in accordance with the invention to polymer compositions comprising at least $C_2$-$C_{10}$-polyalkylene terephthalates, especially polybutylene terephthalate (PBT), and 10,10'-oxybis-12H-phthaloperin-12-one.

Preference is therefore given in accordance with the invention to polymer compositions comprising at least polycarbonate and 10,10'-oxybis-12H-phthaloperin-12-one.

Preference is further given to polymer compositions in which 0.01 to 5 parts by mass, more preferably 0.01 to 3 parts by mass, of 10,10'-oxybis-12H-phthaloperin-12-one are used per 100 parts by mass of $C_2$-$C_{10}$-polyalkylene terephthalates, especially polybutylene terephthalate (PBT).

Preference is further given to polymer compositions in which 0.01 to 5 parts by mass, more preferably 0.01 to 3 parts by mass, of 10,10'-oxybis-12H-phthaloperin-12-one is used per 100 parts by mass of polycarbonate.

The invention also provides high-voltage components, especially high-voltage components for electromobility, based on polymer compositions comprising at least one $C_2$-$C_{10}$-polyalkylene terephthalate, especially polybutylene terephthalate (PBT), and 10,10'-oxybis-12H-phthaloperin-12-one.

The invention also provides high-voltage components, especially high-voltage components for electromobility, based on polymer compositions comprising at least one polycarbonate and 10,10'-oxybis-12H-phthaloperin-12-one.

The invention also provides high-voltage components, especially high-voltage components for electromobility, based on polymer compositions containing 0.01 to 5 parts by mass, more preferably 0.01 to 3 parts by mass, of 10,10'-oxybis-12H-phthaloperin-12-one per 100 parts by mass of $C_2$-$C_{10}$-polyalkylene terephthalate, especially PBT.

The invention also provides high-voltage components, especially high-voltage components for electromobility, based on polymer compositions containing 0.01 to 5 parts by mass, more preferably 0.01 to 3 parts by mass, of 10,10'-oxybis-12H-phthaloperin-12-one per 100 parts by mass of polycarbonate.

The invention also provides laser-transparent high-voltage components, especially high-voltage components for electromobility, having a laser transparency of at least 5%, based on polymer compositions comprising 0.01 to 3 parts by mass of 10,10'-oxybis-12H-phthaloperin-12-one per 100 parts by mass of $C_2$-$C_{10}$-polyalkylene terephthalate, especially PBT, with the proviso of a color difference $\Delta E<20$ from the L*a*b* coordinates of a color number beginning with "2" in the RAL color chart.

The invention also provides laser-transparent high-voltage components, especially high-voltage components for electromobility, having a laser transparency of at least 5%, based on polymer compositions comprising 0.01 to 3 parts by mass of 10,10'-oxybis-12H-phthaloperin-12-one per 100 parts by mass of polycarbonate, with the proviso of a color difference $\Delta E<20$ from the L*a*b* coordinates of a color number beginning with "2" in the RAL color chart.

The invention also provides laser-absorbing high-voltage components, especially high-voltage components for electromobility, based on polymer compositions comprising 0.01 to 3 parts by mass of 10,10'-oxybis-12H-phthaloperin-12-one per 100 parts by mass of $C_2$-$C_{10}$-polyalkylene terephthalate, especially PBT, and at least one laser absorber selected from the group of antimony trioxide, tin oxide, tin orthophosphate, barium titanate, aluminum oxide, copper hydroxyphosphate, copper orthophosphate, potassium copper diphosphate, copper hydroxide, antimony tin oxide, bismuth trioxide and anthraquinone, with the proviso of a color difference $\Delta E<20$ from the L*a*b* coordinates of a color number beginning with "2" in the RAL color chart. Tin oxide, antimony trioxide or antimony tin oxide are particularly preferred. Antimony trioxide is very particularly preferred. Preference is given to using the laser absorber to be used as additive E) in amounts of preferably 0.01 to 80 parts by mass, more preferably 0.05 to 50 parts by mass, most preferably 0.1 to 30 parts by mass, based in each case on 100 parts by mass of component A).

The invention also provides laser-absorbing high-voltage components, especially high-voltage components for electromobility, based on polymer compositions comprising 0.01 to 3 parts by mass of 10,10'-oxybis-12H-phthaloperin-12-one per 100 parts by mass of polycarbonate, and at least one laser absorber selected from the group of antimony trioxide, tin oxide, tin orthophosphate, barium titanate, aluminum oxide, copper hydroxyphosphate, copper orthophosphate, potassium copper diphosphate, copper hydroxide, antimony tin oxide, bismuth trioxide and anthraquinone, with the proviso of a color difference $\Delta E<20$ from the L*a*b* coordinates of a color number beginning with "2" in the RAL color chart. Tin oxide, antimony trioxide or antimony tin oxide are particularly preferred. Antimony trioxide is very particularly preferred. Preference is given to using the laser absorber to be used as additive E) in amounts of 0.01 to 80 parts by mass, more preferably 0.05 to 50 parts by mass, most preferably 0.1 to 30 parts by mass, based in each case on 100 parts by mass of component A).

The present invention also relates to the use of 10,10'-oxybis-12H-phthaloperin-12-one for production of polymer compositions based on $C_2$-$C_{10}$-polyalkylene terephthalate, especially PBT, preferably high-voltage components based on $C_2$-$C_{10}$-polyalkylene terephthalate, especially PBT, especially high-voltage components based on $C_2$-$C_{10}$-polyalkylene terephthalate, especially PBT, for electromobility.

The present invention also relates however to the use of 10,10'-oxybis-12H-phthaloperin-12-one for production of polymer compositions based on polycarbonate, preferably high-voltage components based on polycarbonate, especially high-voltage components based on polycarbonate for electromobility.

The invention finally relates to the use of 10,10'-oxybis-12H-phthaloperin-12-one for marking products based on $C_2$-$C_{10}$-polyalkylene terephthalate, especially PBT-based products, as high-voltage components The invention finally relates to the use of 10,10'-oxybis-12H-phthaloperin-12-one for marking polycarbonate-based products as high-voltage components.

Component B)

According to the invention, component B) used is 10,10'-oxybis-12H-phthaloperin-12-one [CAS No. 203576-97-0] of the formula (I)

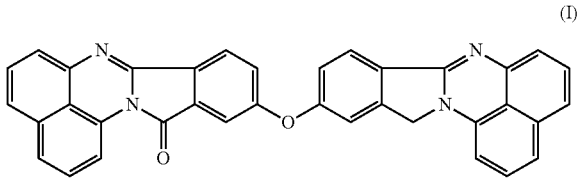 [SMILES: O=C1c2cc(Oc3ccc4c(c3)CN3C4=Nc4cccc5cccc3c45)ccc2C2=Nc3cccc4cccc(c34)N12]

10,10'-Oxybis-12H-phthaloperin-12-one may either be prepared by the synthesis route specified in EP 1 118 640 A1 under example 3) or is obtainable from Angene International Limited, UK Office, Churchill House, London.

10,10'-Oxybis-12H-phthaloperin-12-one may be used directly in powder form or else in the form of a masterbatch, compact or concentrate, preference being given to masterbatches and particular preference to masterbatches in a polymer matrix corresponding to the particular component A).

Component C)

In a preferred embodiment, at least one filler or reinforcer is used as component C). It is also possible in this case to use mixtures of two or more different fillers and/or reinforcers.

Preference is given to using at least one filler or reinforcer from the group of carbon fibers [CAS No. 7440-44-0], glass beads or solid or hollow glass beads, or glass fibers, or ground glass, amorphous quartz glass, aluminum borosilicate glass having an alkali content of 1% (E glass) [CAS No. 65997-17-3], amorphous silica [CAS No. 7631-86-9], quartz flour [CAS No. 14808-60-7], calcium silicate [CAS No. 1344-95-2], calcium metasilicate [CAS No. 10101-39-0], magnesium carbonate [CAS No. 546-93-0], kaolin [CAS No. 1332-58-7], calcined kaolin [CAS No. 92704-41-1], chalk [CAS No. 1317-65-3], kyanite [CAS No. 1302-76-7], powdered or milled quartz [CAS No. 14808-60-7], mica [CAS No. 1318-94-1], phlogopite [CAS No. 12251-00-2], barium sulfate [CAS No. 7727-43-7], feldspar [CAS No. 68476-25-5], wollastonite [CAS No. 13983-17-0], montmorillonite [CAS No. 67479-91-8], pseudoboehmite of formula AlO(OH), magnesium carbonate [CAS No. 12125-28-9] and talc [CAS No. 14807-96-6].

Among the fibrous fillers or reinforcers, glass fibers and wollastonite are particularly preferred, very particular preference being given to glass fibers. In the case of a laser-absorbing component/laser absorbent high-voltage component, carbon fibers may also be used as filler or reinforcer.

With regard to the glass fibers, according to "http://de.wikipedia.org/wiki/Faser-Kunststoff-Verbund", a person skilled in the art will distinguish between chopped fibers, also called short fibers, having a length in the range from 0.1 to 1 mm, long fibers having a length in the range from 1 to 50 mm, and continuous fibers having a length L>50 mm. Short fibers are preferably used in injection molding technology and may be directly processed with an extruder. Long fibers can likewise still be processed in extruders. Said fibers are widely used in fiber spraying. Long fibers are frequently added to thermosets as a filler. Continuous fibers are used in the form of rovings or fabric in fiber-reinforced plastics. Products comprising continuous fibers achieve the highest stiffness and strength values. Also available are ground glass fibers, the length of which after grinding is typically in the range from 70 to 200 μm.

Glass fibers to be used with preference in accordance with the invention as component C) are chopped long glass fibers having an average starting length to be determined by laser diffraction-particle size analysis (laser granulometry/laser diffractometry) according to ISO 13320 in the range from 1 to 50 mm, more preferably in the range from 1 to 10 mm, most preferably in the range from 2 to 7 mm. For laser diffraction particle size determination/laser diffractometry according to standard ISO 13320 see:
https://de.wikipedia.org/wiki/Laserbeugungs-Partikelgr%C3%B6%C3%9Fenanalyse Preferred glass fibers for use as component C) have an average fiber diameter to be determined by laser diffractometry to ISO 13320 in the range from 7 to 18 μm, more preferably in the range from 9 to 15 μm.

In a preferred embodiment, the glass fibers for use with preference as component C) are modified with a suitable size system or an adhesion promoter/adhesion promoter system. Preference is given to using a size system or an adhesion promoter based on silane. Particularly preferred silane-based adhesion promoters for the treatment of the glass fibers for use with preference as component C) are silane compounds of the general formula (IV)

$$(X-(CH_2)_q)_k-Si-(O-CrH_{2r+1})_{4-k} \quad (IV)$$

in which
X is $NH_2-$, carboxyl-, HO— or

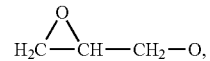

q in formula (XI) is an integer from 2 to 10, preferably 3 to 4,
r in formula (XI) is an integer from 1 to 5, preferably 1 to 2, and
k in formula (XI) is an integer from 1 to 3, preferably 1.

Especially preferred adhesion promoters are silane compounds from the group of aminopropyltrimethoxysilane, aminobutyltrimethoxysilane, aminopropyltriethoxysilane, aminobutyltriethoxysilane, and the corresponding silanes containing a glycidyl group or a carboxyl group as the X substituent, very particular preference especially being given to carboxyl groups.

For the modification of the glass fibers for use with preference as component C), the adhesion promoter, preferably the silane compounds of formula (IV), is used preferably in amounts of 0.05% to 2% by weight, more preferably in amounts of 0.25% to 1.5% by weight and most preferably in amounts of 0.5% to 1% by weight, based in each case on 100% by weight of component C).

The glass fibers to be used with preference as component C), as a result of the processing to give the composition or to give the product, may be shorter in the composition, or in the product, than the glass fibers originally used. Thus, the arithmetic average of the glass fiber length after processing, to be determined by high-resolution x-ray computed tomography, is frequently only in the range from 150 μm to 300 μm.

According to "http://www.r-g.de/wiki/Glasfasern", glass fibers are produced in the melt spinning process (die drawing, rod drawing and die blowing processes). In the die drawing process, the hot mass of glass flows under gravity through hundreds of die bores of a platinum spinneret plate. The filaments can be drawn at a speed of 3-4 km/minute with unlimited length.

Those skilled in the art distinguish between different types of glass fibers, some of which are listed here by way of example:

E glass, the most commonly used material with optimal cost-benefit ratio (E glass from R&G) with a composition according to https://www.r-g.de/wiki/Glasfasern of 53-55% $SiO_2$, 14-15% $Al_2O_3$, 6-8% $B_2O_3$, 17-22% CaO, <5% MgO, <1% $K_2O$ or $Na_2O$ and about 1% other oxides;

H glass, hollow glass fibers for reduced weight (R&G hollow glass fiber weave 160 g/m² and 216 g/m²);

R, S glass, for elevated mechanical demands (S2 glass from R&G);

D glass, borosilicate glass for elevated electrical demands;

C glass, having increased chemical resistance;

Quartz glass, having high thermal stability.

Further examples can be found at "http://de.wikipedia.org/wiki/Glasfaser". E glass fibers have gained the greatest significance for reinforcement of plastics. E stands for electrical glass, since it was originally used in the electrical industry in particular.

For the production of E glass, glass melts are produced from pure quartz with additions of limestone, kaolin and boric acid. As well as silicon dioxide, they contain different amounts of various metal oxides. The composition determines the properties of the products. Preference is given in accordance with the invention to using at least one type of glass fibers from the group of E glass, H glass, R, S glass, D glass, C glass and quartz glass, particular preference being given to using glass fibers made of E glass.

Glass fibers made of E glass are the most commonly used reinforcing material. The strength characteristics correspond to those of metals (for example aluminum alloys), with a lower specific weight of laminates containing E glass fibers than that of metals. E glass fibers are nonflammable, heat resistant up to about 400° C. and stable to most chemicals and weathering effects.

Further preferably used as component C) are also acicular mineral fillers. Acicular mineral fillers are understood in accordance with the invention to mean a mineral filler with highly pronounced acicular character. The acicular mineral filler for use with preference as component C) is wollastonite. The acicular mineral filler preferably has a length:diameter ratio for determination by high-resolution x-ray computed tomography in the range from 2:1 to 35:1, more preferably in the range from 3:1 to 19:1, especially preferably in the range from 4:1 to 12:1. The average particle size of the acicular mineral fillers for determination by high-resolution x-ray computed tomography is preferably less than 20 µm, more preferably less than 15 µm, especially preferably less than 10 µm.

Preference is also given to using, as component C), non-fibrous and non-foamed milled glass having a particle size distribution to be determined by laser diffractometry according to ISO 13320 having a d90 in the range from 5 to 250 µm, preferably in the range from 10 to 150 µm, more preferably in the range from 15 to 80 µm, most preferably in the range from 16 to 25 µm. With regard to the d90 values, their determination and their significance, reference is made to Chemie Ingenieur Technik (72) pp. 273-276, 3/2000, Wiley-VCH Verlags GmbH, Weinheim, 2000, according to which the d90 value is that particle size below which 90% of the amount of particles lie.

It is preferable in accordance with the invention when the non-fibrous and non-foamed milled glass has a particulate, non-cylindrical shape and has a length to thickness ratio to be determined by laser diffractometry according to ISO 13320 of less than 5, preferably less than 3, more preferably less than 2. The value of zero is of course impossible.

The non-foamed and non-fibrous milled glass for use with particular preference as component C) is additionally characterized in that it does not have the glass geometry typical of fibrous glass with a cylindrical or oval cross section having a length to diameter ratio (L/D ratio) to be determined by laser diffractometry according to ISO 13320 greater than 5.

The non-foamed and non-fibrous milled glass for use with particular preference in accordance with the invention as component C) is preferably obtained by grinding glass with a mill, preferably a ball mill, and more preferably with subsequent sifting or sieving.

Preferred starting materials for the milling of the non-fibrous and non-foamed milled glass for use as component C) in one embodiment also include glass wastes as generated as unwanted by-product and/or as off-spec primary product (called offspec material) especially in the production of glass products. These especially include waste glass, recycled glass and broken glass as can be obtained especially in the production of window or bottle glass, and in the production of glass-containing fillers and reinforcers, especially in the form of what are called melt cakes. The glass may be colored, but preference is given to non-colored glass as the starting material for use as component C).

Components D)

In a preferred embodiment, at least one flame retardant is used as component D). Preferred flame retardants are mineral flame retardants, nitrogen-containing flame retardants or phosphorus-containing flame retardants other than component C).

Among the mineral flame retardants, magnesium hydroxide is particularly preferred. Magnesium hydroxide [CAS No. 1309-42-8] may be impure as a result of its origin and mode of production. Typical impurities include, for example, silicon-, iron-, calcium- and/or aluminum-containing species which may be intercalated, for example, in the form of oxides in the magnesium hydroxide crystals. The magnesium hydroxide for use as a mineral flame retardant may be unsized or else sized. The magnesium hydroxide for use as a mineral flame retardant is preferably provided with sizes based on stearates or aminosiloxanes, more preferably with aminosiloxanes. Magnesium hydroxide for use with preference as a mineral flame retardant has a median particle size d50 to be determined by laser diffractometry to ISO 13320 in the range from 0.5 µm to 6 µm, preference being given to a d50 in the range from 0.7 µm to 3.8 µm and particular preference to a d50 in the range from 1.0 µm to 2.6 µm.

Magnesium hydroxide types suitable as a mineral flame retardant according to the invention include for example Magnifin® HSIV from Martinswerk GmbH, Bergheim, Germany or Hidromag® Q2015 TC from Penoles, Mexico City, Mexico.

Preferred nitrogen-containing flame retardants are the reaction products of trichlorotriazine, piperazine and morpholine of CAS No. 1078142-02-5, especially MCA PPM Triazine HF from MCA Technologies GmbH, Biel-Benken, Switzerland, and also melamine cyanurate and condensation products of melamine, especially melem, melam, melon or more highly condensed compounds of this type. Preferred inorganic nitrogen-containing compounds are ammonium salts.

In addition, it is also possible to use salts of aliphatic and aromatic sulfonic acids and mineral flame retardant additives, especially aluminum hydroxide or Ca—Mg carbonate hydrates (DE-A 4 236 122).

Also suitable for use as component D) are flame retardant synergists from the group of oxygen-, nitrogen- or sulfur-containing metal compounds. Preferred among these are zinc-free compounds, especially molybdenum oxide, magnesium oxide, magnesium carbonate, calcium carbonate, calcium oxide, titanium nitride, magnesium nitride, calcium phosphate, calcium borate, magnesium borate or mixtures thereof.

However, in an alternative embodiment, it is also possible to use zinc-containing compounds as component D) if required. These preferably include zinc oxide, zinc borate, zinc stannate, zinc hydroxystannate, zinc sulfide and zinc nitride, or mixtures thereof.

Preferred phosphorus-containing flame retardants are organic metal phosphinates, aluminum salts of phosphonic acid, red phosphorus, inorganic metal hypophosphites, metal phosphonates, derivatives of 9,10-dihydro-9-oxa-10-phosphaphenanthrene 10-oxides (DOPO derivatives), resorcinol bis(diphenyl phosphate) (RDP) including oligomers, bisphenol A bis(diphenyl phosphate) (BDP) including oligomers, melamine pyrophosphate, melamine polyphosphate, melamine poly(aluminum phosphate), melamine poly(zinc phosphate) or phenoxyphosphazene oligomers and mixtures thereof.

A preferred organic metal phosphinate is aluminum tris (diethylphosphinate). A preferred inorganic metal hypophosphite is aluminum hypophosphite.

Further flame retardants for use as component D) are char formers, more preferably phenol-formaldehyde resins, polycarbonates, polyimides, polysulfones, polyether sulfones or polyether ketones, and also antidrip agents, especially tetrafluoroethylene polymers.

The flame retardants to be used as component D) may be added in pure form, or else via masterbatches or compactates.

However, in an alternative embodiment—if required and taking into account the disadvantages of loss of freedom from halogen of the flame retardants—halogen-containing flame retardants may also be used as flame retardants. Preferred halogen-containing flame retardants are commercially available organic halogen compounds, more preferably ethylene-1,2-bistetrabromophthalimide, decabromodiphenylethane, tetrabromobisphenol A epoxy oligomer, tetrabromobisphenol A oligocarbonate, tetrachlorobisphenol A oligocarbonate, polypentabromobenzyl acrylate, brominated polystyrene or brominated polyphenylene ethers, which can be used alone or in combination with synergists, especially antimony trioxide or antimony pentoxide, particular preference being given to brominated polystyrene among the halogen-containing flame retardants. Brominated polystyrene is used here preferably in amounts in the range from 10% to 30% by weight, more preferably in amounts in the range from 15% to 25% by weight, based in each case on the overall composition, where at least one of the other components is reduced to such an extent that the sum total of all weight percentages is always 100.

Brominated polystyrene is commercially available in a very wide variety of product qualities. Examples thereof are for example Firemaster® PBS64 from Lanxess, Cologne, Germany and Saytex® HP-3010 from Albemarle, Baton Rouge, USA.

Among the flame retardants for use as component D), very particular preference is given to aluminum tris(diethylphosphinate) [CAS No. 225789-38-8] and the combination of aluminum tris(diethylphosphinate) and melamine polyphosphate or the combination of aluminum tris(diethylphosphinate) and at least one aluminum salt of phosphonic acid, the latter combination being especially preferred.

Aluminum tris(diethylphosphinate) [CAS No. 225789-38-8] or the combinations of aluminum tris(diethylphosphinate) and melamine polyphosphate or of aluminum tris (diethylphosphinate) and at least one aluminum salt of phosphonic acid are used in amounts of preferably 5-35% by weight, more preferably 10-30% by weight, most preferably 15-25% by weight, based in each case on the overall composition, wherein at least one of the other components is reduced to such an extent that all weight percentages always add up to 100.

In the case of combinations of aluminum tris(diethylphosphinate) and melamine polyphosphate or of aluminum tris (diethylphosphinate) and at least one aluminum salt of phosphonic acid, the proportion of aluminum tris(diethylphosphinate) is preferably 40-90 parts by weight, more preferably 50-80 parts by weight, most preferably 60-70 parts by weight, based in each case on 100 parts by weight of the combination of aluminum tris(diethylphosphinate) and melamine polyphosphate or the combination of aluminum tris(diethylphosphinate) and at least one aluminum salt of phosphonic acid.

An example of a suitable aluminum tris(diethylphosphinate) for use as component D) is Exolit® OP1230 or Exolit® OP1240 from Clariant International Ltd. Muttenz, Switzerland. Melamine polyphosphate is commercially available in a wide variety of product qualities. Examples thereof are for example Melapur® 200/70 from BASF, Ludwigshafen, Germany, and also Budit® 3141 from Budenheim, Budenheim, Germany.

Preferred aluminum salts of phosphonic acid are selected from the group of primary aluminum phosphonate [$Al(H_2PO_3)_3$],
basic aluminum phosphonate [$Al((OH)H_2PO_3)_2 \cdot 2H_2O$],
$Al_2(HPO_3)_3 \cdot xAl_2O_3 \cdot nH_2O$ where x is in the range from 2.27 to 1 and n is in the range from 0 to 4, $$Al_2(HPO_3)_3 \cdot (H_2O)_q \qquad (V)$$

where q is in the range from 0 to 4, especially aluminum phosphonate tetrahydrate [$Al_2(HPO_3)_3 \cdot 4H_2O$] or secondary aluminum phosphonate [$Al_2(HPO_3)_3$], $$Al_2M_z(HPO_3)_y(OH)_v \cdot (H_2O)_w \qquad (VI)$$

in which M represents alkali metal ion(s) and z is in the range from 0.01 to 1.5, y is in the range from 2.63-3.5, v is in the range from 0 to 2 and w is in the range from 0 to 4, and $$Al_2(HPO_3)_u(H_2PO_3)_t \cdot (H_2O)_s \qquad (VII)$$

in which u is in the range of 2 to 2.99, t is in the range from 2 to 0.01 and s is in the range from 0 to 4,
where z, y and v in formula (VI) and u and t in formula (VII) can assume only such numbers that the corresponding aluminum salt of phosphonic acid as a whole is uncharged.

Preferred alkali metals in formula (VI) are sodium and potassium.

The aluminum salts of phosphonic acid described may be used individually or in a mixture.

Particularly preferred aluminum salts of phosphonic acid are selected from the group of
primary aluminum phosphonate [Al(H$_2$PO$_3$)$_3$],
secondary aluminum phosphonate [Al$_2$(HPO$_3$)$_3$],
basic aluminum phosphonate [Al((OH)H$_2$PO$_3$)$_2$·2H$_2$O],
aluminum phosphonate tetrahydrate [Al$_2$(HPO$_3$)$_3$·4H$_2$O] and
Al$_2$(HPO$_3$)$_3$·xAl$_2$O$_3$·nH$_2$O where x is in the range from 2.27 to 1 and n is in the range from 0 to 4.

Very particular preference is given to secondary aluminum phosphonate Al$_2$(HPO$_3$)$_3$ [CAS No. 71449-76-8] and secondary aluminum phosphonate tetrahydrate Al$_2$(HPO$_3$)$_3$·4H$_2$O [CAS No. 156024-71-4], secondary aluminum phosphonate Al$_2$(HPO$_3$)$_3$ being especially preferred.

The preparation of aluminum salts of phosphonic acid for use in accordance with the invention as component D) is described, for example, in WO 2013/083247 A1. It typically comprises reacting an aluminum source, preferably aluminum isopropoxide, aluminum nitrate, aluminum chloride or aluminum hydroxide, with a phosphorus source, preferably phosphonic acid, ammonium phosphonate, alkali metal phosphonate, and optionally with a template in a solvent at 20° C. to 200° C. over a period of up to 4 days. To this end the aluminum source and the phosphorus source are mixed, heated under hydrothermal conditions or under reflux, filtered, washed and dried. Preferred templates are hexane-1,6-diamine, guanidine carbonate or ammonia. A preferred solvent is water.

Component E)

At least one further additive other than components B) to D) is used as component E). Preferred additives for use as component E) are antioxidants, heat stabilizers, UV stabilizers, gamma ray stabilizers, components for reducing water absorption/hydrolysis stabilizers, antistats, emulsifiers, nucleating agents, plasticizers, processing aids, impact modifiers, chain-extending additives, colorants other than component B), laser absorbers, lubricants and/or demolding agents, components for reducing water absorption, flow auxiliaries or elastomer modifiers. The additives may be used alone or in a mixture, or in the form of masterbatches.

Preferred heat stabilizers of component E) are sterically hindered phenols, especially those containing at least one 2,6-di-tert-butylphenyl- and/or 2-tert-butyl-6-methylphenyl group, furthermore phosphites, hypophosphites, especially sodium hypophosphite NaH$_2$PO$_2$, hydroquinones, aromatic secondary amines, substituted resorcinols, salicylates, benzotriazoles and benzophenones, 3,3'-thiodipropionate esters and variously substituted representatives of these groups or mixtures thereof.

In one embodiment, thermal stabilizers used in component E) may also be copper salts, preferably in combination with sodium hypophosphite NaH$_2$PO$_2$. The copper salt used is preferably copper(I) iodide [CAS No. 7681-65-4] and/or (triphenylphosphino)copper iodide [CAS No. 47107-74-4]. The copper salts are preferably used in combination with at least one alkali metal iodide, more preferably with potassium iodide [CAS No. 7681-11-0].

In the case of the heat stabilizers for use as component E) these are used in amounts of preferably 0.01 to 2 parts by mass, more preferably 0.05 to 1 part by mass, based in each case on 100 parts by mass of the component A).

UV stabilizers to be used as component E) are preferably substituted resorcinols, salicylates, benzotriazoles, HALS derivatives ("Hindered Amine Light Stabilizers") containing at least one 2,2,6,6-tetramethyl-4-piperidyl unit and benzophenones.

UV stabilizers for use as component E) are used in amounts of preferably 0.01 to 2 parts by mass, more preferably 0.1 to 1 part by mass, based in each case on 100 parts by mass of component A).

Colorants other than component B) that are to be used as component E) are preferably inorganic pigments, especially ultramarine blue, bismuth vanadate, iron oxide, titanium dioxide, zinc sulfide, zinc-titanium-zinc oxides [CAS No. 923954-49-8], and also organic dyes, preferably phthalocyanines, quinacridones, benzimidazoles, especially Ni-2-hydroxynaphthylbenzimidazole [CAS No. 42844-93-9] and/or pyrimidineazobenzimidazole [CAS No. 72102-84-2] and/or Pigment Yellow 192 [CAS No. 56279-27-7], and also perylenes, anthraquinones, especially C.I. Solvent Yellow 163 [CAS No. 13676-91-0], this enumeration being nonexhaustive.

In one embodiment, preferably in the case of a laser-absorbing component/high-voltage component, carbon black or nigrosin are also used as colorant.

Nucleating agents to be used as component E) are preferably sodium phenylphosphinate or calcium phenylphosphinate, aluminum oxide or silicon dioxide, and most preferably talc, this enumeration being non-conclusive.

Flow auxiliaries to be used as component E) are preferably copolymers of at least one α-olefin with at least one methacrylic ester or acrylic ester of an aliphatic alcohol. Particular preference is given here to copolymers in which the α-olefin has been formed from ethene and/or propene and the methacrylic ester or acrylic ester contains, as its alcohol component, linear or branched alkyl groups having 6 to 20 carbon atoms. Very particular preference is given to 2-ethylhexyl acrylate. Features of the copolymers suitable as flow auxiliaries are not just their composition but also their low molecular weight. Accordingly, suitable copolymers for the compositions that are to be protected from thermal degradation in accordance with the invention are particularly those which have an MFI value measured at 190° C. and a load of 2.16 kg of at least 100 g/10 min, preferably of at least 150 g/10 min, more preferably of at least 300 g/10 min. The MFI, melt flow index, characterizes the flow of a melt of a thermoplastic and is subject to the standards ISO 1133 or ASTM D 1238. The flow auxiliary used is especially preferably a copolymer of ethene and 2-ethylhexyl acrylate with MFI 550, known as Lotryl® 37EH550.

Chain-extending additives to be used as component E) are preferably di- or polyfunctional branching or chain-extending additives containing at least two branching or chain-extending functional groups per molecule. Preferred branching or chain-extending additives include low molecular weight or oligomeric compounds which have at least two chain-extending functional groups per molecule which are capable of reacting with primary and/or secondary amino groups and/or amide groups and/or carboxylic acid groups. Chain-extending functional groups are preferably isocyanates, alcohols, blocked isocyanates, epoxides, maleic anhydride, oxazoline, oxazine, oxazolone, preference being given to epoxides.

Especially preferred di- or polyfunctional branching or chain-extending additives are diepoxides based on diglycidyl ethers (bisphenol and epichlorohydrin), based on amine epoxy resin (aniline and epichlorohydrin), based on diglycidyl esters (cycloaliphatic dicarboxylic acids and epichlorohydrin), separately or in mixtures, and also 2,2-bis [p-hydroxyphenyl]propane diglycidyl ether, bis[p-(N- methyl-N-2,3-epoxypropylamino)phenyl]methane and epoxidized fatty acid esters of glycerol comprising at least two epoxy groups per molecule.

Particularly preferred di- or polyfunctional branching or chain-extending additives are glycidyl ethers, most preferably bisphenol A diglycidyl ether [CAS No. 98460-24-3], or epoxidized fatty acid esters of glycerol, and also most preferably epoxidized soya oil [CAS No. 8013-07-8] and/or epoxidized linseed oil.

Plasticizers for use with preference as component E) are dioctyl phthalate, dibenzyl phthalate, butyl benzyl phthalate, hydrocarbon oils or N-(n-butyl)benzenesulfonamide.

Elastomer modifiers to be used with preference as component E) include one or more graft polymers of E.1 5% to 95% by weight, preferably 30% to 90% by weight, of at least one vinyl monomer and E.2 95% to 5% by weight, preferably 70% to 10% by weight, of one or more graft bases having glass transition temperatures <10° C., preferably <0° C., more preferably <−20° C., where the percentages by weight are based on 100% by weight of elastomer modifier.

The graft substrate E.2 generally has an average particle size d50 value to be determined by laser diffractometry according to ISO 13320 of 0.05 to 10 µm, preferably 0.1 to 5 µm, more preferably 0.2 to 1 µm.

Monomers E.1 are preferably mixtures of

E.1.1 50% to 99% by weight of vinylaromatics and/or ring-substituted vinylaromatics, especially styrene, α-methylstyrene, p-methylstyrene, p-chlorostyrene, and/or ($C_1$-$C_8$)-alkyl methacrylates, especially methyl methacrylate, ethyl methacrylate and E.1.2 1% to 50% by weight of vinyl cyanides, especially unsaturated nitriles such as acrylonitrile and methacrylonitrile and/or ($C_1$-$C_8$)-alkyl (meth)acrylates, especially methyl methacrylate, glycidyl methacrylate, n-butyl acrylate, t-butyl acrylate, and/or derivatives, especially anhydrides and imides of unsaturated carboxylic acids, especially maleic anhydride or N-phenylmaleimide, where the percentages by weight are based on 100% by weight of elastomer modifier.

Preferred monomers E.1.1 are selected from at least one of the monomers styrene, α-methylstyrene and methyl methacrylate; preferred monomers E.1.2 are selected from at least one of the monomers acrylonitrile, maleic anhydride, glycidyl methacrylate and methyl methacrylate. Particularly preferred monomers are E.1.1 styrene and E.1.2 acrylonitrile.

Graft bases E.2 suitable for the graft polymers for use in the elastomer modifiers are, for example, diene rubbers, EPDM rubbers, i.e. those based on ethylene/propylene and optionally diene, and also acrylate, polyurethane, silicone, chloroprene and ethylene/vinyl acetate rubbers. EPDM stands for ethylene-propylene-diene rubber.

Preferred graft bases E.2 are diene rubbers, especially based on butadiene, isoprene, etc., or mixtures of diene rubbers or copolymers of diene rubbers or mixtures thereof with further copolymerizable monomers, especially of E.1.1 and E.1.2, with the proviso that the glass transition temperature of component E.2 is <10° C., preferably <0° C., more preferably <−10° C.

Particularly preferred graft bases E.2 are ABS polymers (emulsion, bulk and suspension ABS), where ABS stands for acrylonitrile-butadiene-styrene, as described, for example, in DE-A 2 035 390 or in DE-A 2 248 242 or in Ullmann, Enzyklopädie der Technischen Chemie, vol. 19 (1980), p. 277-295. The gel content of the graft base E.2 is preferably at least 30% by weight, more preferably at least 40% by weight (measured in toluene).

The elastomer modifiers/graft polymers for use as component E) are produced by free-radical polymerization, preferably by emulsion, suspension, solution or bulk polymerization, especially by emulsion or bulk polymerization.

Particularly suitable graft rubbers also include ABS polymers, which are produced by redox initiation with an initiator system composed of organic hydroperoxide and ascorbic acid according to U.S. Pat. No. 4,937,285.

Since, as is well known, the graft monomers are not necessarily completely grafted onto the graft base in the grafting reaction, graft polymers are also understood in accordance with the invention to mean products that result from (co)polymerization of the graft monomers in the presence of the graft base and are also obtained in the workup.

Likewise suitable acrylate rubbers are based on graft bases E.2 that are preferably polymers of alkyl acrylates, optionally having up to 40% by weight, based on E.2, of other polymerizable, ethylenically unsaturated monomers. The preferred polymerizable acrylic esters include $C_1$-$C_8$-alkyl esters, preferably methyl, ethyl, butyl, n-octyl and 2-ethylhexyl esters; haloalkyl esters, preferably halo-$C_1$-$C_8$-alkyl esters, such as chloroethyl acrylate, glycidyl esters, and mixtures of these monomers. Particular preference is given here to graft polymers with butyl acrylate as core and methyl methacrylates as shell, especially Paraloid® EXL2300, Dow Corning Corporation, Midland, Michigan, USA.

As an alternative to the ethylenically unsaturated monomers, crosslinking may be achieved by copolymerizing monomers having more than one polymerizable double bond. Preferred crosslinking monomers are esters of unsaturated monocarboxylic acids having 3 to 8 carbon atoms and unsaturated monohydric alcohols having 3 to 12 carbon atoms or of saturated polyols having 2 to 4 OH groups and 2 to 20 carbon atoms, preferably ethylene glycol dimethacrylate, allyl methacrylate; polyunsaturated heterocyclic compounds, preferably trivinyl cyanurate and triallyl cyanurate; polyfunctional vinyl compounds, preferably di- and trivinylbenzenes; but also triallyl phosphate and diallyl phthalate.

Particularly preferred crosslinking monomers are allyl methacrylate, ethylene glycol dimethacrylate, diallyl phthalate and heterocyclic compounds having at least 3 ethylenically unsaturated groups.

Very particularly preferred crosslinking monomers are the cyclic monomers triallyl cyanurate, triallyl isocyanurate, triacryloylhexahydro-s-triazine, triallylbenzenes. The amount of the crosslinked monomers is preferably 0.02% to 5% by weight, especially 0.05% to 2% by weight, based on the graft base E.2.

In the case of cyclic crosslinking monomers having at least 3 ethylenically unsaturated groups, it is advantageous to restrict the amount to less than 1% by weight of the graft base E.2.

Preferred "other" polymerizable, ethylenically unsaturated monomers which, in addition to the acrylic esters, may optionally be used to produce the graft base E.2 are acrylonitrile, styrene, α-methylstyrene, acrylamides, vinyl $C_1$-$C_6$-alkyl ethers, methyl methacrylate, glycidyl methacrylate, butadiene. Preferred acrylate rubbers as graft base E.2 are emulsion polymers having a gel content of at least 60% by weight.

Further graft bases E.2 that are suitable with preference are silicone rubbers having graft-active sites, as described in DE-A 3 704 657, DE-A 3 704 655, DE-A 3 631 540 and DE-A 3 631 539.

Preferred graft polymers comprising a silicone proportion are those comprising methyl methacrylate or styrene-acrylonitrile as the shell and a silicone/acrylate graft as the core. Styrene-acrylonitrile to be used with preference as the shell is Metablen® SRK200. Methyl methacrylate to be used with preference as the shell is Metablen® S2001 or Metablen® S2030 or Metablen® SX-005. Particular preference is given to using Metablen® S2001. The products having the Metablen® trade name are available from Mitsubishi Rayon Co., Ltd., Tokyo, Japan.

Crosslinking may be achieved by copolymerizing monomers having more than one polymerizable double bond. Preferred examples of crosslinking monomers are esters of unsaturated monocarboxylic acids having 3 to 8 carbon atoms and unsaturated monohydric alcohols having 3 to 12 carbon atoms or of saturated polyols having 2 to 4 OH groups and 2 to 20 carbon atoms, preferably ethylene glycol dimethacrylate, allyl methacrylate; polyunsaturated heterocyclic compounds, preferably trivinyl cyanurate and triallyl cyanurate; polyfunctional vinyl compounds, preferably di- and trivinylbenzenes; but also triallyl phosphate and diallyl phthalate.

Preferred crosslinking monomers are allyl methacrylate, ethylene glycol dimethacrylate, diallyl phthalate and heterocyclic compounds having at least 3 ethylenically unsaturated groups.

Particularly preferred crosslinking monomers are the cyclic monomers triallyl cyanurate, triallyl isocyanurate, triacryloylhexahydro-s-triazine, triallylbenzenes. The amount of the crosslinked monomers is preferably 0.02% to 5% by weight, especially 0.05% to 2% by weight, based on the graft base E.2.

In the case of cyclic crosslinking monomers having at least 3 ethylenically unsaturated groups, it is advantageous to restrict the amount to less than 1% by weight of the graft base E.2.

Preferred "other" polymerizable, ethylenically unsaturated monomers which, in addition to the acrylic esters, may optionally be used to produce the graft base E.2 are acrylonitrile, styrene, α-methylstyrene, acrylamides, vinyl $C_1$-$C_6$-alkyl ethers, methyl methacrylate, glycidyl methacrylate, butadiene. Preferred acrylate rubbers as graft base E.2 are emulsion polymers having a gel content of at least 60% by weight.

In addition to elastomer modifiers based on graft polymers, it is likewise possible to use elastomer modifiers which are not based on graft polymers and which have glass transition temperatures of <10° C., preferably <0° C., more preferably <−20° C. These preferably include elastomers having a block copolymer structure, and additionally thermoplastically meltable elastomers, especially EPM, EPDM and/or SEBS rubbers (EPM=ethylene-propylene copolymer, EPDM=ethylene-propylene-diene rubber and SEBS=styrene-ethene-butene-styrene copolymer).

Lubricants and/or demolding agents for use as component E) are preferably long-chain fatty acids, especially stearic acid or behenic acid, salts thereof, especially calcium stearate or zinc stearate, and the ester derivatives thereof, especially those based on pentaerythritol, especially fatty acid esters of pentaerythritol or amide derivatives, especially ethylenebisstearylamide, montan waxes and low molecular weight polyethylene or polypropylene waxes.

Montan waxes in the context of the present invention are mixtures of straight-chain saturated carboxylic acids having chain lengths of 28 to 32 carbon atoms.

According to the invention, particular preference is given to using lubricants and/or demolding agents from the group of esters of saturated or unsaturated aliphatic carboxylic acids having 8 to 40 carbon atoms with aliphatic saturated alcohols or amides of amines having 2 to 40 carbon atoms with unsaturated aliphatic carboxylic acids having 8 to 40 carbon atoms or instead of the respective carboxylic acids metal salts of saturated or unsaturated aliphatic carboxylic acids having 8 to 40 carbon atoms.

Lubricants and/or demolding agents to be used with very particular preference as component E) are to be selected from the group of pentaerythritol tetrastearate [CAS No. 115-83-3], ethylenebisstearylamide, calcium stearate and ethylene glycol dimontanate. The use of calcium stearate [CAS No. 1592-23-0] or ethylenebisstearylamide [CAS No. 110-30-5] is especially preferred. The use of ethylenebisstearylamide (Loxiol® EBS from Emery Oleochemicals) is very especially preferred.

Hydrolysis stabilizers/components for reducing water absorption for use with preference as component E) are preferably polyesters, preference being given to polybutylene terephthalate and/or polyethylene terephthalate and very particular preference to polyethylene terephthalate. The polyesters are used preferably in concentrations of 5% to 20% by weight and more preferably in concentrations of 7% to 15% by weight, based in each case on the overall polymer composition and with the proviso that the sum total of all percentages by weight of the polymer composition is always 100% by weight.

In the case of a laser-absorbing component/laser-absorbing high-voltage component, it is possible to use, as component E), at least one laser absorber selected from the group of antimony trioxide, tin oxide, tin orthophosphate, barium titanate, aluminum oxide, copper hydroxyphosphate, copper orthophosphate, potassium copper diphosphate, copper hydroxide, antimony tin oxide, bismuth trioxide and anthraquinone. Tin oxide, antimony trioxide or antimony tin oxide are particularly preferred. Antimony trioxide is very particularly preferred.

The laser absorber, especially the antimony trioxide, may be used directly as a powder or in the form of masterbatches. The laser absorber may be used individually or as a mixture of two or more laser absorbers.

Laser absorbers can absorb laser light of a particular wavelength. In practice, this wavelength is in the range from 157 nm to 10.6 µm. Examples of lasers of these wavelengths are described in WO2009/003976 A1. Preference is given to using Nd:YAG lasers, which can achieve wavelengths of 1064, 532, 355 and 266 nm, and $CO_2$ lasers.

Laser-Transparent High-Voltage Components

According to the invention, the laser-transparent high-voltage components encompass preferred ranges as defined for component A). Preference is given to high-voltage components, especially high-voltage components for electromobility, based on polymer compositions comprising
A) per 100 parts by mass of at least one polyester,
B) 0.01 to 5 parts by mass of 10,10'-oxybis-12H-phthaloperin-12-one and
C) 1 to 150 parts by mass of at least one filler and reinforcer that should be selected from the group of glass beads or solid or hollow glass beads, or glass fibers, or ground glass, amorphous quartz glass, aluminum borosilicate glass having an alkali content of 1% (E glass), amorphous silica, quartz flour, calcium silicate, calcium metasilicate, magnesium carbonate, kaolin, calcined kaolin, chalk, kyanite, powdered or ground quartz, mica, phlogopite, barium sulfate, feldspar, wollastonite, montmorillonite, pseudoboehmite of the formula AlO(OH), magnesium carbonate and talc, especially glass fibers, with the proviso of a color difference ΔE<20 from the L*a*b* coordinates of a color number beginning with "2" in the RAL color chart and a laser transparency at a wavelength of 980 nm of at least 5%.

Preference is given in accordance with the invention to high-voltage components, especially high-voltage components for electromobility, based on polymer compositions comprising
- A) per 100 parts by mass of at least one polyester,
- B) 0.01 to 5 parts by mass of 10,10'-oxybis-12H-phthaloperin-12-one,
- C) 1 to 150 parts by mass of at least one filler and reinforcer preferably to be selected from the group of glass beads or solid or hollow glass beads, or glass fibers, or ground glass, amorphous quartz glass, aluminum borosilicate glass having an alkali content of 1% (E glass), amorphous silica, quartz flour, calcium silicate, calcium metasilicate, magnesium carbonate, kaolin, calcined kaolin, chalk, kyanite, powdered or ground quartz, mica, phlogopite, barium sulfate, feldspar, wollastonite, montmorillonite, pseudoboehmite of the formula AlO(OH), magnesium carbonate and talc, especially glass fibers, and
- D) 3 to 100 parts by mass of at least one flame retardant additive, preferably to be selected from mineral flame retardants, nitrogen-containing flame retardants and phosphorus-containing flame retardants, with the proviso of a color difference ΔE<20 from the L*a*b* coordinates of a color number beginning with "2" in the RAL color chart and a laser transparency at a wavelength of 980 nm of at least 5%.

Preference is given in accordance with the invention to high-voltage components, especially high-voltage components for electromobility, based on polymer compositions comprising
- A) per 100 parts by mass of at least one polyester,
- B) 0.01 to 5 parts by mass of 10,10'-oxybis-12H-phthaloperin-12-one,
- C) 1 to 150 parts by mass of at least one filler and reinforcer preferably to be selected from the group of glass beads or solid or hollow glass beads, or glass fibers, or ground glass, amorphous quartz glass, aluminum borosilicate glass having an alkali content of 1% (E glass), amorphous silica, quartz flour, calcium silicate, calcium metasilicate, magnesium carbonate, kaolin, calcined kaolin, chalk, kyanite, powdered or ground quartz, mica, phlogopite, barium sulfate, feldspar, wollastonite, montmorillonite, pseudoboehmite of the formula AlO(OH), magnesium carbonate and talc, especially glass fibers, and
- E) 0.01 to 2 parts by mass of at least one additive other than components B) to D), to be selected from the group of the antioxidants, heat stabilizers, UV stabilizers, gamma ray stabilizers, components for reducing water absorption/hydrolysis stabilizers, antistats, emulsifiers, nucleating agents, plasticizers, processing aids, impact modifiers, chain-extending additives, colorants other than component B), lubricants and/or demolding agents, components for reducing water absorption, flow auxiliaries and elastomer modifiers, with the proviso of a color difference ΔE<20 from the L*a*b* coordinates of a color number beginning with "2" in the RAL color chart and a laser transparency at a wavelength of 980 nm of at least 5%.

Preference is given in accordance with the invention to high-voltage components, especially high-voltage components for electromobility, based on polymer compositions comprising
- A) per 100 parts by mass of at least one polyester,
- B) 0.01 to 5 parts by mass of 10,10'-oxybis-12H-phthaloperin-12-one,
- C) 1 to 150 parts by mass of at least one filler and reinforcer preferably to be selected from the group of glass beads or solid or hollow glass beads, or glass fibers, or ground glass, amorphous quartz glass, aluminum borosilicate glass having an alkali content of 1% (E glass), amorphous silica, quartz flour, calcium silicate, calcium metasilicate, magnesium carbonate, kaolin, calcined kaolin, chalk, kyanite, powdered or ground quartz, mica, phlogopite, barium sulfate, feldspar, wollastonite, montmorillonite, pseudoboehmite of the formula AlO(OH), magnesium carbonate and talc, especially glass fibers,
- D) 3 to 100 parts by mass of at least one flame retardant additive, preferably to be selected from mineral flame retardants, nitrogen-containing flame retardants or phosphorus-containing flame retardants, and
- E) 0.01 to 2 parts by mass of at least one additive other than components B) to D), to be selected from the group of the antioxidants, heat stabilizers, UV stabilizers, gamma ray stabilizers, components for reducing water absorption/hydrolysis stabilizers, antistats, emulsifiers, nucleating agents, plasticizers, processing aids, impact modifiers, chain-extending additives, colorants other than component B), lubricants and/or demolding agents, components for reducing water absorption, flow auxiliaries and elastomer modifiers, with the proviso of a color difference ΔE<20 from the L*a*b* coordinates of a color number beginning with "2" in the RAL color chart and a laser transparency at a wavelength of 980 nm of at least 5%. Preference is given to a laser transparency/laser transmittance at a wavelength of 980 nm of at least 10%, more preferably in the range from 25% to 98%, especially in the range of 25% to 60%. With regard to laser transparency, see especially K. D. Feddersen "Laserdurchstrahlschweißen—die Lösung für nicht lösbare Verbindungen", Österreichische Kunststoffzeitschrift 1/2 2018, pages 50-52.

Laser-Transparent High-Voltage Components Based on $C_2$-$C_{10}$-polyalkylene Terephthalates According to the invention, the laser-transparent high-voltage components encompass all the definitions for component A) with regard to the $C_2$-$C_{10}$-polyalkylene terephthalates defined therein. Preference is given to high-voltage components, especially high-voltage components for electromobility, based on polymer compositions comprising
- A) per 100 parts by mass of at least one $C_2$-$C_{10}$-polyalkylene terephthalate, preferably polybutylene terephthalate,
- B) 0.01 to 5 parts by mass of 10,10'-oxybis-12H-phthaloperin-12-one and
- C) 1 to 150 parts by mass of at least one filler and reinforcer that should be selected from the group of glass beads or solid or hollow glass beads, or glass fibers, or ground glass, amorphous quartz glass, aluminum borosilicate glass having an alkali content of 1% (E glass), amorphous silica, quartz flour, calcium silicate, calcium metasilicate, magnesium carbonate, kaolin, calcined kaolin, chalk, kyanite, powdered or ground quartz, mica, phlogopite, barium sulfate, feldspar, wollastonite, montmorillonite, pseudoboehmite of the formula AlO(OH), magnesium carbonate and talc, especially glass fibers, with the proviso of a color difference ΔE<20 from the L*a*b* coordinates of a color number beginning with "2" in the RAL color chart and a laser transparency at a wavelength of 980 nm of at least 5%.

Preference is given in accordance with the invention to high-voltage components, especially high-voltage components for electromobility, based on polymer compositions containing A) per 100 parts by mass of at least one $C_2$-$C_{10}$-polyalkylene terephthalate, preferably polybutylene terephthalate, B) 0.01 to 5 parts by mass of 10,10'-oxybis-12H-phthaloperin-12-one, C) 1 to 150 parts by mass of at least one filler and reinforcer preferably to be selected from the group of glass beads or solid or hollow glass beads, or glass fibers, or ground glass, amorphous quartz glass, aluminum borosilicate glass having an alkali content of 1% (E glass), amorphous silica, quartz flour, calcium silicate, calcium metasilicate, magnesium carbonate, kaolin, calcined kaolin, chalk, kyanite, powdered or ground quartz, mica, phlogopite, barium sulfate, feldspar, wollastonite, montmorillonite, pseudoboehmite of the formula AlO(OH), magnesium carbonate and talc, especially glass fibers, and D) 3 to 100 parts by mass of at least one flame retardant additive, preferably to be selected from mineral flame retardants, nitrogen-containing flame retardants and phosphorus-containing flame retardants, with the proviso of a color difference ΔE<20 from the L*a*b* coordinates of a color number beginning with "2" in the RAL color chart and a laser transparency at a wavelength of 980 nm of at least 5%.

Preference is given in accordance with the invention to high-voltage components, especially high-voltage components for electromobility, based on polymer compositions comprising A) per 100 parts by mass of at least one $C_2$-$C_{10}$-polyalkylene terephthalate, preferably polybutylene terephthalate, B) 0.01 to 5 parts by mass of 10,10'-oxybis-12H-phthaloperin-12-one, C) 1 to 150 parts by mass of at least one filler and reinforcer preferably to be selected from the group of glass beads or solid or hollow glass beads, or glass fibers, or ground glass, amorphous quartz glass, aluminum borosilicate glass having an alkali content of 1% (E glass), amorphous silica, quartz flour, calcium silicate, calcium metasilicate, magnesium carbonate, kaolin, calcined kaolin, chalk, kyanite, powdered or ground quartz, mica, phlogopite, barium sulfate, feldspar, wollastonite, montmorillonite, pseudoboehmite of the formula AlO(OH), magnesium carbonate and talc, especially glass fibers, and E) 0.01 to 2 parts by mass of at least one additive other than components B) to D), to be selected from the group of the antioxidants, heat stabilizers, UV stabilizers, gamma ray stabilizers, components for reducing water absorption/hydrolysis stabilizers, antistats, emulsifiers, nucleating agents, plasticizers, processing aids, impact modifiers, chain-extending additives, colorants other than component B), lubricants and/or demolding agents, components for reducing water absorption, flow auxiliaries and elastomer modifiers, with the proviso of a color difference ΔE<20 from the L*a*b* coordinates of a color number beginning with "2" in the RAL color chart and a laser transparency at a wavelength of 980 nm of at least 5%.

Preference is given in accordance with the invention to high-voltage components, especially high-voltage components for electromobility, based on polymer compositions comprising A) per 100 parts by mass of at least one $C_2$-$C_{10}$-polyalkylene terephthalate, preferably polybutylene terephthalate, B) 0.01 to 5 parts by mass of 10,10'-oxybis-12H-phthaloperin-12-one, C) 1 to 150 parts by mass of at least one filler and reinforcer preferably to be selected from the group of glass beads or solid or hollow glass beads, or glass fibers, or ground glass, amorphous quartz glass, aluminum borosilicate glass having an alkali content of 1% (E glass), amorphous silica, quartz flour, calcium silicate, calcium metasilicate, magnesium carbonate, kaolin, calcined kaolin, chalk, kyanite, powdered or ground quartz, mica, phlogopite, barium sulfate, feldspar, wollastonite, montmorillonite, pseudoboehmite of the formula AlO(OH), magnesium carbonate and talc, especially glass fibers, D) 3 to 100 parts by mass of at least one flame retardant additive, preferably to be selected from mineral flame retardants, nitrogen-containing flame retardants and phosphorus-containing flame retardants, and E) 0.01 to 2 parts by mass of at least one additive other than components B) to D), to be selected from the group of the antioxidants, heat stabilizers, UV stabilizers, gamma ray stabilizers, components for reducing water absorption/hydrolysis stabilizers, antistats, emulsifiers, nucleating agents, plasticizers, processing aids, impact modifiers, chain-extending additives, colorants other than component B), laser absorbers, lubricants and/or demolding agents, components for reducing water absorption, flow auxiliaries and elastomer modifiers, with the proviso of a color difference ΔE<20 from the L*a*b* coordinates of a color number beginning with "2" in the RAL color chart and a laser transparency at a wavelength of 980 nm of at least 5%.

Particular preference is given in accordance with the invention to $C_2$-$C_{10}$-polyalkylene terephthalate-based, preferably polybutylene terephthalate-based, high-voltage components, especially $C_2$-$C_{10}$-polyalkylene terephthalate-based, preferably polybutylene terephthalate-based, high-voltage components for electromobility, with the proviso of a color difference ΔE<20 from the L*a*b* coordinates of a color number beginning with "2" in the RAL color chart and a laser transparency/laser transmission at a wavelength of 980 nm of preferably at least 10%, more preferably in the range from 25% to 98%, especially in the range of 25% to 60%. With regard to laser transparency, see above and especially K. D. Feddersen "Laserdurchstrahlschweißen— die Lösung für nicht lösbare Verbindungen", Österreichische Kunststoffzeitschrift 1/2 2018, pages 50-52.

Laser-Transparent High-Voltage Components Based on Polycarbonate

The invention encompasses all preferred ranges with regard to polycarbonates that are defined under component A). Preference is given to high-voltage components, especially high-voltage components for electromobility, based on polymer compositions comprising
- A) per 100 parts by mass of at least one polycarbonate,
- B) 0.01 to 5 parts by mass of 10,10'-oxybis-12H-phthaloperin-12-one and
- C) 1 to 150 parts by mass of at least one filler and reinforcer that should be selected from the group of glass beads or solid or hollow glass beads, or glass fibers, or ground glass, amorphous quartz glass, aluminum borosilicate glass having an alkali content of 1% (E glass), amorphous silica, quartz flour, calcium silicate, calcium metasilicate, magnesium carbonate, kaolin, calcined kaolin, chalk, kyanite, powdered or ground quartz, mica, phlogopite, barium sulfate, feldspar, wollastonite, montmorillonite, pseudoboehmite of the formula AlO(OH), magnesium carbonate and talc, especially glass fibers, with the proviso of a color difference $\Delta E < 20$ from the L*a*b* coordinates of a color number beginning with "2" in the RAL color chart and a laser transparency at a wavelength of 980 nm of at least 5%.

Preference is given in accordance with the invention to high-voltage components, especially high-voltage components for electromobility, based on polymer compositions containing
- A) per 100 parts by mass of at least one polycarbonate,
- B) 0.01 to 5 parts by mass of 10,10'-oxybis-12H-phthaloperin-12-one,
- C) 1 to 150 parts by mass of at least one filler and reinforcer preferably to be selected from the group of glass beads or solid or hollow glass beads, or glass fibers, or ground glass, amorphous quartz glass, aluminum borosilicate glass having an alkali content of 1% (E glass), amorphous silica, quartz flour, calcium silicate, calcium metasilicate, magnesium carbonate, kaolin, calcined kaolin, chalk, kyanite, powdered or ground quartz, mica, phlogopite, barium sulfate, feldspar, wollastonite, montmorillonite, pseudoboehmite of the formula AlO(OH), magnesium carbonate and talc, especially glass fibers, and
- D) 3 to 100 parts by mass of at least one flame retardant additive, preferably to be selected from mineral flame retardants, nitrogen-containing flame retardants and phosphorus-containing flame retardants, with the proviso of a color difference $\Delta E < 20$ from the L*a*b* coordinates of a color number beginning with "2" in the RAL color chart and a laser transparency at a wavelength of 980 nm of at least 5%.

Preference is given in accordance with the invention to high-voltage components, especially high-voltage components for electromobility, based on polymer compositions containing
- A) per 100 parts by mass of at least one polycarbonate,
- B) 0.01 to 5 parts by mass of 10,10'-oxybis-12H-phthaloperin-12-one,
- C) 1 to 150 parts by mass of at least one filler and reinforcer preferably to be selected from the group of glass beads or solid or hollow glass beads, or glass fibers, or ground glass, amorphous quartz glass, aluminum borosilicate glass having an alkali content of 1% (E glass), amorphous silica, quartz flour, calcium silicate, calcium metasilicate, magnesium carbonate, kaolin, calcined kaolin, chalk, kyanite, powdered or ground quartz, mica, phlogopite, barium sulfate, feldspar, wollastonite, montmorillonite, pseudoboehmite of the formula AlO(OH), magnesium carbonate and talc, especially glass fibers, and
- E) 0.01 to 2 parts by mass of at least one additive other than components B) to D), to be selected from the group of the antioxidants, heat stabilizers, UV stabilizers, gamma ray stabilizers, components for reducing water absorption/hydrolysis stabilizers, antistats, emulsifiers, nucleating agents, plasticizers, processing aids, impact modifiers, chain-extending additives, colorants other than component B), lubricants and/or demolding agents, components for reducing water absorption, flow auxiliaries and elastomer modifiers, with the proviso of a color difference $\Delta E < 20$ from the L*a*b* coordinates of a color number beginning with "2" in the RAL color chart and a laser transparency at a wavelength of 980 nm of at least 5%.

Preference is given in accordance with the invention to high-voltage components, especially high-voltage components for electromobility, based on polymer compositions containing
- A) per 100 parts by mass of at least one polycarbonate,
- B) 0.01 to 5 parts by mass of 10,10'-oxybis-12H-phthaloperin-12-one,
- C) 1 to 150 parts by mass of at least one filler and reinforcer preferably to be selected from the group of glass beads or solid or hollow glass beads, or glass fibers, or ground glass, amorphous quartz glass, aluminum borosilicate glass having an alkali content of 1% (E glass), amorphous silica, quartz flour, calcium silicate, calcium metasilicate, magnesium carbonate, kaolin, calcined kaolin, chalk, kyanite, powdered or ground quartz, mica, phlogopite, barium sulfate, feldspar, wollastonite, montmorillonite, pseudoboehmite of the formula AlO(OH), magnesium carbonate and talc, especially glass fibers,
- D) 3 to 100 parts by mass of at least one flame retardant additive, preferably to be selected from mineral flame retardants, nitrogen-containing flame retardants and phosphorus-containing flame retardants, and
- E) 0.01 to 2 parts by mass of at least one additive other than components B) to D), to be selected from the group of the antioxidants, heat stabilizers, UV stabilizers, gamma ray stabilizers, components for reducing water absorption/hydrolysis stabilizers, antistats, emulsifiers, nucleating agents, plasticizers, processing aids, impact modifiers, chain-extending additives, colorants other than component B), laser absorbers, lubricants and/or demolding agents, components for reducing water absorption, flow auxiliaries and elastomer modifiers, with the proviso of a color difference $\Delta E < 20$ from the L*a*b* coordinates of a color number beginning with "2" in the RAL color chart and a laser transparency at a wavelength of 980 nm of at least 5%.

Particular preference is given in accordance with the invention to polycarbonate-based high-voltage components, especially high-voltage components for electromobility, with the proviso of a color difference $\Delta E < 20$ from the L*a*b* coordinates of a color number beginning with "2" in the RAL color chart and a laser transparency at a wavelength of 980 nm of preferably at least 10%, more preferably in the range from 25% to 98%, especially in the range from 25% to 60%. With regard to laser transparency, see above and especially K. D. Feddersen "Laserdurchstrahlschweißen— die Lösung für nicht lösbare Verbindungen", Österreichische Kunststoffzeitschrift 1/2 2018, pages 50-52.

Laser-Absorbing High-Voltage Components

The present invention additionally relates to laser-absorbing high-voltage components, especially high-voltage components for electromobility, based on polymer compositions comprising
- A) per 100 parts by mass of at least one polyester, preferably at least one $C_2$-$C_{10}$-polyalkylene terephthalate, especially polybutylene terephthalate, or at least one polycarbonate,
- B) 0.01 to 5 parts by mass of 10,10'-oxybis-12H-phthaloperin-12-one and
- E) 0.01 to 2 parts by mass of at least one laser absorber selected from the group of antimony trioxide, tin oxide, tin orthophosphate, barium titanate, aluminum oxide, copper hydroxyphosphate, copper orthophosphate, potassium copper diphosphate, copper hydroxide, antimony tin oxide, bismuth trioxide and anthraquinone are used. Tin oxide, antimony trioxide or antimony tin oxide are particularly preferred. Antimony trioxide is very particularly preferred,
- with the proviso of a color difference ΔE<20 from the L*a*b* coordinates of a color number beginning with "2" in the RAL color chart.

The present invention further relates to laser-absorbing high-voltage components, especially high-voltage components for electromobility, based on polymer compositions comprising
- A) per 100 parts by mass of at least one polyester, preferably at least one $C_2$-$C_{10}$-polyalkylene terephthalate, especially polybutylene terephthalate, or at least one polycarbonate,
- B) 0.01 to 5 parts by mass of 10,10'-oxybis-12H-phthaloperin-12-one,
- C) 1 to 150 parts by mass of at least one filler and reinforcer to be selected from the group of glass beads or solid or hollow glass beads, or glass fibers, or ground glass, amorphous quartz glass, aluminum borosilicate glass having an alkali content of 1% (E glass), amorphous silica, quartz flour, calcium silicate, calcium metasilicate, magnesium carbonate, kaolin, calcined kaolin, chalk, kyanite, powdered or ground quartz, mica, phlogopite, barium sulfate, feldspar, wollastonite, montmorillonite, pseudoboehmite of the formula AlO(OH), magnesium carbonate and talc, especially glass fibers, and
- E) 0.01 to 2 parts by mass of at least one laser absorber selected from the group of antimony trioxide, tin oxide, tin orthophosphate, barium titanate, aluminum oxide, copper hydroxyphosphate, copper orthophosphate, potassium copper diphosphate, copper hydroxide, antimony tin oxide, bismuth trioxide and anthraquinone,
- with the proviso of a color difference ΔE<20 from the L*a*b* coordinates of a color number beginning with "2" in the RAL color chart.

The invention further relates to laser-absorbing high-voltage components, especially high-voltage components for electromobility, based on polymer compositions comprising
- A) per 100 parts by mass of at least one polyester, preferably at least one $C_2$-$C_{10}$-polyalkylene terephthalate, especially polybutylene terephthalate, or at least one polycarbonate,
- B) 0.01 to 5 parts by mass of 10,10'-oxybis-12H-phthaloperin-12-one,
- C) 1 to 150 parts by mass of at least one filler and reinforcer preferably to be selected from the group of glass beads or solid or hollow glass beads, or glass fibers, or ground glass, amorphous quartz glass, aluminum borosilicate glass having an alkali content of 1% (E glass), amorphous silica, quartz flour, calcium silicate, calcium metasilicate, magnesium carbonate, kaolin, calcined kaolin, chalk, kyanite, powdered or ground quartz, mica, phlogopite, barium sulfate, feldspar, wollastonite, montmorillonite, pseudoboehmite of the formula AlO(OH), magnesium carbonate and talc, especially glass fibers,
- D) 3 to 100 parts by mass of at least one flame retardant additive, preferably to be selected from mineral flame retardants, nitrogen-containing flame retardants and phosphorus-containing flame retardants, and
- E) 0.01 to 2 parts by mass of at least one laser absorber selected from the group of antimony trioxide, tin oxide, tin orthophosphate, barium titanate, aluminum oxide, copper hydroxyphosphate, copper orthophosphate, potassium copper diphosphate, copper hydroxide, antimony tin oxide, bismuth trioxide and anthraquinone,
- with the proviso of a color difference ΔE<20 from the L*a*b* coordinates of a color number beginning with "2" in the RAL color chart. Particular preference is given to using, as component E), tin oxide, antimony trioxide or antimony tin oxide, most preferably antimony trioxide.

By way of clarification, it should be noted that the scope of the present invention encompasses all definitions and parameters listed in general or specified in the areas of preference in the context of the polymer compositions in any combinations of the inventive high-voltage components, preferably high-voltage components for electromobility.

Preferred high-voltage components, especially high-voltage components for electromobility, but also laser-transparent and laser-transmitting high-voltage components find use in electrical drivetrains and/or in battery systems. Particularly preferred high-voltage components are covers for electrics or electronics, control devices, covers/housings for fuses, relays, battery cell modules, fuse holders, fuse plugs, terminals, cable holders or sheathings, especially sheathings of high-voltage bus bars.

Process for Producing Laser-Transparent Polyester Compositions

The present invention additionally relates to a process for producing polymer compositions having a color difference ΔE<20 from the L*a*b* coordinates of a color number beginning with "2" in the RAL color chart, preferably a ΔE<10, more preferably ΔE<5, and a laser transparency at a wavelength of 980 nm of at least 5%, by mixing A) at least one polyester, preferably at least one polycarbonate or at least one $C_2$-$C_{10}$-polyalkylene terephthalate, especially at least polybutylene terephthalate (PBT), and B) 10,10'-oxybis-12H-phthaloperin-12-one, and optionally at least one of the further components C), D) and E) with one another in at least one mixing tool, discharging to give strands, cooling until pelletizable, optionally drying and pelletizing, wherein 0.01 to 5 parts by mass of 10,10'-oxybis-12H-phthaloperin-12-one are used per 100 parts by mass of at least one polyester and E) is not a laser absorber. The polymer compositions preferably have a laser transparency at a wavelength of 980 nm of at least 10%, more preferably in the range from 25% to 98%, especially in the range from 25% to 60%.

In one embodiment, the polymer compositions of the invention are stored intermediately in pelletized form.

Process for Producing Laser-Transparent High-Voltage Components

The present invention additionally relates to a process for producing high-voltage components, especially high-voltage components for electromobility, having a color difference ΔE<20 from the L*a*b* coordinates of a color number beginning with "2" in the RAL color chart, preferably a ΔE<10, more preferably ΔE<5, and a laser transparency at a wavelength of 980 nm of at least 5%, by subjecting the $C_2$-$C_{10}$-polyalkylene terephthalate-based, preferably polybutylene terephthalate-based, or polycarbonate-based polymer compositions to further processing by injection molding, including the special methods of GIT (gas injection technology), WIT (water injection technology) and PIT (projectile injection technology), by extrusion methods, including profile extrusion, or by blow molding.

The laser-transparent polyester-based high-voltage components to be produced by the process, especially the high-voltage components for electromobility, preferably have a laser transparency at a wavelength of 980 nm of at least 25%, more preferably in the range from 25% to 98%, especially in the range from 25% to 60%.

By way of clarification, it should be noted that the scope of the present invention encompasses all definitions and parameters listed in general in the context of the polymer compositions or high-voltage components or specified in areas of preference in any combinations of the processes of the invention.

Irrespective of the process variant, the laser welding process is highly dependent on the material properties of the two joining partners. The degree of laser transparency (LT) of the part through which the laser passes directly influences the process speed by virtue of the amount of energy that can be introduced per unit time. Semicrystalline thermoplastics generally have lower laser transparency by virtue of their inherent microstructure, usually in the form of spherulites. These scatter the incident laser light more significantly than the internal structure of a purely amorphous thermoplastic: Backscatter leads to a reduced amount of total energy in transmission; diffuse (lateral) scatter often leads to broadening of the laser beam and hence loss of welding precision. A semicrystalline morphology is generally a hindrance to high laser transparency, but offers advantages in other properties. For instance, semicrystalline materials are mechanically durable even above the glass transition temperature and generally have better chemical resistance than amorphous materials. Rapidly crystallizing materials additionally offer advantages in processing, especially rapid demoldability and hence short cycle times. What is therefore desirable is combination of semicrystallinity, rapid crystallization and high laser transparency. The selection of further components C) fillers or reinforcers, D) flame-retardant additive and E) thermal stabilizer, and any further additives, has to be made with the proviso that, firstly, the products, high-voltage components and high-voltage components for electromobility that are to be produced in accordance with the invention have a color difference ΔE<20 from the L*a*b* coordinates of a color number beginning with "2" in the RAL color chart, and also a laser transparency of at least 5% at a wavelength of 980 nm.

Preference is given in accordance with the invention to a process for producing high-voltage components, especially high-voltage components for electromobility, having a color difference ΔE<20 from the L*a*b* coordinates of a color number beginning with "2" in the RAL color chart, preferably a ΔE<10, more preferably ΔE<5, and a laser transparency at a wavelength of 980 nm of at least 5%, by mixing A) at least one $C_2$-$C_{10}$-polyalkylene terephthalate and B) 10,10'-oxybis-12H-phthaloperin-12-one with one another to give polymer compositions, extruding to give strands, cooling until pelletizable, drying and pelletizing, and then subjecting the polymer compositions to further processing by injection molding, including the special methods of GIT (gas injection technology), WIT (water injection technology) and PIT (projectile injection technology), by extrusion methods, including profile extrusion, or by blow molding, wherein A) per 100 parts by mass of at least one $C_2$-$C_{10}$-polyalkylene terephthalate, especially PBT, B) 0.01 to 5 parts by mass of 10,10'-oxybis-12H-phthaloperin-12-one and C) 1 to 150 parts by mass of at least one filler and reinforcer to be selected from the group of glass beads or solid or hollow glass beads, or glass fibers, or ground glass, amorphous quartz glass, aluminum borosilicate glass having an alkali content of 1% (E glass), amorphous silica, quartz flour, calcium silicate, calcium metasilicate, magnesium carbonate, kaolin, calcined kaolin, chalk, kyanite, powdered or ground quartz, mica, phlogopite, barium sulfate, feldspar, wollastonite, montmorillonite, pseudoboehmite of the formula AlO(OH), magnesium carbonate and talc, especially glass fibers, are used.

Preference is given in accordance with the invention to a process for producing high-voltage components, especially high-voltage components for electromobility, having a color difference ΔE<20 from the L*a*b* coordinates of a color number beginning with "2" in the RAL color chart, preferably a ΔE<10, more preferably ΔE<5, and a laser transparency at a wavelength of 980 nm of at least 5%, by mixing A) at least one polycarbonate and B) 10,10'-oxybis-12H-phthaloperin-12-one with one another to give polymer compositions, extruding to give strands, cooling until pelletizable, drying and pelletizing, and then subjecting the polymer compositions to further processing by injection molding, including the special methods of GIT (gas injection technology), WIT (water injection technology) and PIT (projectile injection technology), by extrusion methods, including profile extrusion, or by blow molding, wherein A) per 100 parts by mass of at least one polycarbonate, B) 0.01 to 5 parts by mass of 10,10'-oxybis-12H-phthaloperin-12-one and C) 1 to 150 parts by mass of at least one filler and reinforcer to be selected from the group of glass beads or solid or hollow glass beads, or glass fibers, or ground glass, amorphous quartz glass, aluminum borosilicate glass having an alkali content of 1% (E glass), amorphous silica, quartz flour, calcium silicate, calcium metasilicate, magnesium carbonate, kaolin, calcined kaolin, chalk, kyanite, powdered or ground quartz, mica, phlogopite, barium sulfate, feldspar, wollastonite, montmorillonite, pseudoboehmite of the formula AlO(OH), magnesium carbonate and talc, especially glass fibers, are used.

Preference is given in accordance with the invention to a process for producing high-voltage components, especially high-voltage components for electromobility, having a color difference ΔE<20 from the L*a*b* coordinates of a color number beginning with "2" in the RAL color chart, preferably a ΔE<10, more preferably ΔE<5, and a laser transparency at a wavelength of 980 nm of at least 5%, by mixing A) per 100 parts by mass of at least one $C_2$-$C_{10}$-polyalkylene terephthalate, preferably PBT, B) 0.01 to 5 parts by mass of 10,10'-oxybis-12H-phthaloperin-12-one, C) 1 to 150 parts by mass of at least one filler and reinforcer, preferably to be selected from the group of glass beads or solid or hollow glass beads, or glass fibers, or ground glass, amorphous quartz glass, aluminum borosilicate glass having an alkali content of 1% (E glass), amorphous silica, quartz flour, calcium silicate, calcium metasilicate, magnesium carbonate, kaolin, calcined kaolin, chalk, kyanite, powdered or ground quartz, mica, phlogopite, barium sulfate, feldspar, wollastonite, montmorillonite, pseudoboehmite of the formula AlO(OH), magnesium carbonate and talc, especially glass fibers, and D) 3 to 100 parts by mass of at least one flame retardant additive, preferably to be selected from mineral flame retardants, nitrogen-containing flame retardants and phosphorus-containing flame retardants, with one another to give polymer compositions, extruding to strands, cooling until pelletizable, drying and pelletizing, and then processing the polymer compositions further by injection molding, including the special methods of GIT (gas injection technology), WIT (water injection technology) and PIT (projectile injection technology), by extrusion methods, including profile extrusion, or by blow molding.

Preference is given in accordance with the invention to a process for producing high-voltage components, especially high-voltage components for electromobility, having a color difference $\Delta E<20$ from the L*a*b* coordinates of a color number beginning with "2" in the RAL color chart, preferably a $\Delta E<10$, more preferably $\Delta E<5$, and a laser transparency at a wavelength of 980 nm of at least 5%, by mixing A) per 100 parts by mass of at least one polycarbonate,
B) 0.01 to 5 parts by mass of 10,10'-oxybis-12H-phthaloperin-12-one,
C) 1 to 150 parts by mass of at least one filler and reinforcer, preferably to be selected from the group of glass beads or solid or hollow glass beads, or glass fibers, or ground glass, amorphous quartz glass, aluminum borosilicate glass having an alkali content of 1% (E glass), amorphous silica, quartz flour, calcium silicate, calcium metasilicate, magnesium carbonate, kaolin, calcined kaolin, chalk, kyanite, powdered or ground quartz, mica, phlogopite, barium sulfate, feldspar, wollastonite, montmorillonite, pseudoboehmite of the formula AlO(OH), magnesium carbonate and talc, especially glass fibers, and
D) 3 to 100 parts by mass of at least one flame retardant additive, preferably to be selected from mineral flame retardants, nitrogen-containing flame retardants and phosphorus-containing flame retardants, with one another to give polymer compositions, extruding to strands, cooling until pelletizable, drying and pelletizing, and then processing the polymer compositions further by injection molding, including the special methods of GIT (gas injection technology), WIT (water injection technology) and PIT (projectile injection technology), by extrusion methods, including profile extrusion, or by blow molding.

Preference is given in accordance with the invention to a process for producing high-voltage components, especially high-voltage components for electromobility, having a color difference $\Delta E<20$ from the L*a*b* coordinates of a color number beginning with "2" in the RAL color chart, preferably a $\Delta E<10$, more preferably $\Delta E<5$, and a laser transparency at a wavelength of 980 nm of at least 5%, by mixing A) per 100 parts by mass of at least one $C_2$-$C_{10}$-polyalkylene terephthalate, preferably PBT,
B) 0.01 to 5 parts by mass of 10,10'-oxybis-12H-phthaloperin-12-one,
C) 1 to 150 parts by mass of at least one filler and reinforcer preferably to be selected from the group of glass beads or solid or hollow glass beads, or glass fibers, or ground glass, amorphous quartz glass, aluminum borosilicate glass having an alkali content of 1% (E glass), amorphous silica, quartz flour, calcium silicate, calcium metasilicate, magnesium carbonate, kaolin, calcined kaolin, chalk, kyanite, powdered or ground quartz, mica, phlogopite, barium sulfate, feldspar, wollastonite, montmorillonite, pseudoboehmite of the formula AlO(OH), magnesium carbonate and talc, especially glass fibers, and
E) 0.01 to 2 parts by mass of at least one thermal stabilizer, preferably to be selected from the group of sterically hindered phenols, especially those containing at least one 2,6-di-tert-butylphenyl group and/or 2-tert-butyl-6-methylphenyl group, and also phosphites, hypophosphites, especially sodium hypophosphite $NaH_2PO_2$, hydroquinones, aromatic secondary amines and 3,3'-thiodipropionates, with one another to give polymer compositions, extruding to strands, cooling until pelletizable, drying and pelletizing, and then processing the polymer compositions further by injection molding, including the special methods of GIT (gas injection technology), WIT (water injection technology) and PIT (projectile injection technology), by extrusion methods, including profile extrusion, or by blow molding.

Preference is given in accordance with the invention to a process for producing high-voltage components, especially high-voltage components for electromobility, having a color difference $\Delta E<20$ from the L*a*b* coordinates of a color number beginning with "2" in the RAL color chart, preferably a $\Delta E<10$, more preferably $\Delta E<5$, and a laser transparency at a wavelength of 980 nm of at least 5%, by mixing A) per 100 parts by mass of at least one polycarbonate,
B) 0.01 to 5 parts by mass of 10,10'-oxybis-12H-phthaloperin-12-one,
C) 1 to 150 parts by mass of at least one filler and reinforcer preferably to be selected from the group of glass beads or solid or hollow glass beads, or glass fibers, or ground glass, amorphous quartz glass, aluminum borosilicate glass having an alkali content of 1% (E glass), amorphous silica, quartz flour, calcium silicate, calcium metasilicate, magnesium carbonate, kaolin, calcined kaolin, chalk, kyanite, powdered or ground quartz, mica, phlogopite, barium sulfate, feldspar, wollastonite, montmorillonite, pseudoboehmite of the formula AlO(OH), magnesium carbonate and talc, especially glass fibers, and
E) 0.01 to 2 parts by mass of at least one thermal stabilizer, preferably to be selected from the group of sterically hindered phenols, especially those containing at least one 2,6-di-tert-butylphenyl group and/or 2-tert-butyl-6-methylphenyl group, and also phosphites, hypophosphites, especially sodium hypophosphite $NaH_2PO_2$, hydroquinones, aromatic secondary amines and 3,3'-thiodipropionates, with one another to give polymer compositions, extruding to strands, cooling until pelletizable, drying and pelletizing, and then processing the polymer compositions further by injection molding, including the special methods of GIT (gas injection technology), WIT (water injection technology) and PIT (projectile injection technology), by extrusion methods, including profile extrusion, or by blow molding.

Preference is given in accordance with the invention to a process for producing high-voltage components, especially high-voltage components for electromobility, having a color difference $\Delta E<20$ from the L*a*b* coordinates of a color number beginning with "2" in the RAL color chart, preferably a $\Delta E<10$, more preferably $\Delta E<5$, and a laser transparency at a wavelength of 980 nm of at least 5%, by mixing
- A) per 100 parts by mass of at least one $C_2$-$C_{10}$-polyalkylene terephthalate, preferably PBT,
- B) 0.01 to 5 parts by mass of 10,10'-oxybis-12H-phthaloperin-12-one,
- C) 1 to 150 parts by mass of at least one filler and reinforcer preferably to be selected from the group of glass beads or solid or hollow glass beads, or glass fibers, or ground glass, amorphous quartz glass, aluminum borosilicate glass having an alkali content of 1% (E glass), amorphous silica, quartz flour, calcium silicate, calcium metasilicate, magnesium carbonate, kaolin, calcined kaolin, chalk, kyanite, powdered or ground quartz, mica, phlogopite, barium sulfate, feldspar, wollastonite, montmorillonite, pseudoboehmite of the formula AlO(OH), magnesium carbonate and talc, especially glass fibers,
- D) 3 to 100 parts by mass of at least one flame retardant additive, preferably to be selected from mineral flame retardants, nitrogen-containing flame retardants and phosphorus-containing flame retardants, and
- E) 0.01 to 2 parts by mass of at least one thermal stabilizer, preferably to be selected from the group of sterically hindered phenols, especially those containing at least one 2,6-di-tert-butylphenyl group and/or 2-tert-butyl-6-methylphenyl group, and also phosphites, hypophosphites, especially sodium hypophosphite $NaH_2PO_2$, hydroquinones, aromatic secondary amines and 3,3'-thiodipropionates, with one another to give polymer compositions, extruding to strands, cooling until pelletizable, drying and pelletizing, and then processing the polymer compositions further by injection molding, including the special methods of GIT (gas injection technology), WIT (water injection technology) and PIT (projectile injection technology), by extrusion methods, including profile extrusion, or by blow molding.

Preference is given in accordance with the invention to a process for producing high-voltage components, especially high-voltage components for electromobility, having a color difference $\Delta E<20$ from the L*a*b* coordinates of a color number beginning with "2" in the RAL color chart, preferably a $\Delta E<10$, more preferably $\Delta E<5$, and a laser transparency at a wavelength of 980 nm of at least 5%, by mixing
- A) per 100 parts by mass of at least one polycarbonate,
- B) 0.01 to 5 parts by mass of 10,10'-oxybis-12H-phthaloperin-12-one,
- C) 1 to 150 parts by mass of at least one filler and reinforcer preferably to be selected from the group of glass beads or solid or hollow glass beads, or glass fibers, or ground glass, amorphous quartz glass, aluminum borosilicate glass having an alkali content of 1% (E glass), amorphous silica, quartz flour, calcium silicate, calcium metasilicate, magnesium carbonate, kaolin, calcined kaolin, chalk, kyanite, powdered or ground quartz, mica, phlogopite, barium sulfate, feldspar, wollastonite, montmorillonite, pseudoboehmite of the formula AlO(OH), magnesium carbonate and talc, especially glass fibers, and
- D) 3 to 100 parts by mass of at least one flame retardant additive, preferably to be selected from mineral flame retardants, nitrogen-containing flame retardants and phosphorus-containing flame retardants, and
- E) 0.01 to 2 parts by mass of at least one thermal stabilizer, preferably to be selected from the group of sterically hindered phenols, especially those containing at least one 2,6-di-tert-butylphenyl group and/or 2-tert-butyl-6-methylphenyl group, and also phosphites, hypophosphites, especially sodium hypophosphite $NaH_2PO_2$, hydroquinones, aromatic secondary amines and 3,3'-thiodipropionates, with one another to give polymer compositions, extruding to strands, cooling until pelletizable, drying and pelletizing, and then processing the polymer compositions further by injection molding, including the special methods of GIT (gas injection technology), WIT (water injection technology) and PIT (projectile injection technology), by extrusion methods, including profile extrusion, or by blow molding.

Process for Producing Laser-Absorbing High-Voltage Components

In the case of a process for producing laser-absorbing polymer compositions or high-voltage components, especially high-voltage components for electromobility, component E) used comprises laser absorbers selected from the group of antimony trioxide, tin oxide, tin orthophosphate, barium titanate, aluminum oxide, copper hydroxyphosphate, copper orthophosphate, potassium copper diphosphate, copper hydroxide, antimony tin oxide, bismuth trioxide and anthraquinone. Tin oxide, antimony trioxide or antimony tin oxide are particularly preferred. Antimony trioxide is very particularly preferred.

The invention therefore also relates to a process for producing laser-absorbing high-voltage components, especially high-voltage components for electromobility, the present invention relates to a process for producing high-voltage components, especially high-voltage components for electromobility, having a color difference $\Delta E<20$ from the L*a*b* coordinates of a color number beginning with "2" in the RAL color chart, preferably a $\Delta E<10$, more preferably $\Delta E<5$, by mixing polymer compositions comprising
- A) per 100 parts by mass of at least one polyester, preferably at least one $C_2$-$C_{10}$-polyalkylene terephthalate or polycarbonate, especially PBT,
- B) 0.01 to 5 parts by mass of 10,10'-oxybis-12H-phthaloperin-12-one and
- E) 0.01 to 2 parts by mass of at least one laser absorber selected from the group of antimony trioxide, tin oxide, tin orthophosphate, barium titanate, aluminum oxide, copper hydroxyphosphate, copper orthophosphate, potassium copper diphosphate, copper hydroxide, antimony tin oxide, bismuth trioxide and anthraquinone, with one another to give polymer compositions, extruding to strands, cooling until pelletizable, drying and pelletizing, and then processing the polymer compositions further by injection molding, including the special methods of GIT (gas injection technology), WIT (water injection technology) and PIT (projectile injection technology), by extrusion methods, including profile extrusion, or by blow molding.

Particular preference is given to using, as component E) for laser-absorbing high-voltage components, tin oxide, antimony trioxide or antimony tin oxide, most preferably antimony trioxide.

The invention preferably relates to a process for producing laser-absorbing high-voltage components, especially high-voltage components for electromobility, having a color difference $\Delta E<20$ from the L*a*b* coordinates of a color number beginning with "2" in the RAL color chart, preferably a $\Delta E<10$, more preferably $\Delta E<5$, by mixing polymer compositions comprising

- A) per 100 parts by mass of at least one polyester, preferably at least one $C_2$-$C_{10}$-polyalkylene terephthalate or polycarbonate, especially PBT,
- B) 0.01 to 5 parts by mass of 10,10'-oxybis-12H-phthaloperin-12-one,
- C) 1 to 150 parts by mass of at least one filler and reinforcer to be selected from the group of glass beads or solid or hollow glass beads, or glass fibers, or ground glass, amorphous quartz glass, aluminum borosilicate glass having an alkali content of 1% (E glass), amorphous silica, quartz flour, calcium silicate, calcium metasilicate, magnesium carbonate, kaolin, calcined kaolin, chalk, kyanite, powdered or ground quartz, mica, phlogopite, barium sulfate, feldspar, wollastonite, montmorillonite, pseudoboehmite of the formula AlO(OH), magnesium carbonate and talc, especially glass fibers, and
- E) 0.01 to 2 parts by mass of at least one laser absorber selected from the group of antimony trioxide, tin oxide, tin orthophosphate, barium titanate, aluminum oxide, copper hydroxyphosphate, copper orthophosphate, potassium copper diphosphate, copper hydroxide, antimony tin oxide, bismuth trioxide and anthraquinone, with one another to give polymer compositions, extruding to strands, cooling until pelletizable, drying and pelletizing, and then processing the polymer compositions further by injection molding, including the special methods of GIT (gas injection technology), WIT (water injection technology) and PIT (projectile injection technology), by extrusion methods, including profile extrusion, or by blow molding.

Preference is given in accordance with the invention to a process for producing high-voltage components, especially high-voltage components for electromobility, which a color difference $\Delta E<20$ from the L*a*b* coordinates of a color number beginning with "2" in the RAL color chart, preferably a $\Delta E<10$, more preferably $\Delta E<5$, by mixing

- A) per 100 parts by mass of at least one polyester, preferably at least one $C_2$-$C_{10}$-polyalkylene terephthalate or polycarbonate, especially PBT,
- B) 0.01 to 5 parts by mass of 10,10'-oxybis-12H-phthaloperin-12-one,
- C) 1 to 150 parts by mass of at least one filler and reinforcer, preferably to be selected from the group of glass beads or solid or hollow glass beads, or glass fibers, or ground glass, amorphous quartz glass, aluminum borosilicate glass having an alkali content of 1% (E glass), amorphous silica, quartz flour, calcium silicate, calcium metasilicate, magnesium carbonate, kaolin, calcined kaolin, chalk, kyanite, powdered or ground quartz, mica, phlogopite, barium sulfate, feldspar, wollastonite, montmorillonite, pseudoboehmite of the formula AlO(OH), magnesium carbonate and talc, especially glass fibers,
- D) 3 to 100 parts by mass of at least one flame retardant additive, preferably to be selected from mineral flame retardants, nitrogen-containing flame retardants and phosphorus-containing flame retardants, and
- E) 0.01 to 2 parts by mass of at least one laser absorber selected from the group of antimony trioxide, tin oxide, tin orthophosphate, barium titanate, aluminum oxide, copper hydroxyphosphate, copper orthophosphate, potassium copper diphosphate, copper hydroxide, antimony tin oxide, bismuth trioxide and anthraquinone, with one another to give polymer compositions, extruding to strands, cooling until pelletizable, drying and pelletizing, and then processing the polymer compositions further by injection molding, including the special methods of GIT (gas injection technology), WIT (water injection technology) and PIT (projectile injection technology), by extrusion methods, including profile extrusion, or by blow molding.

Use of 10,10'-oxybis-12H-phthaloperin-12-one for Laser-Transparent Products or High-Voltage Components The present invention also relates to the use of 10,10'-oxybis-12H-phthaloperin-12-one for production of polyester-based products, with the proviso that these have a color difference $\Delta E<20$ from the L*a*b* coordinates of a color number beginning with "2" in the RAL color chart, preferably a $\Delta E<10$, more preferably $\Delta E<5$, and a laser transparency at a wavelength of 980 nm of at least 5%; see the above details under the heading "Orange" that are applicable to the uses claimed here. Polyesters to be used with preference are $C_2$-$C_{10}$-polyalkylene terephthalate, especially PBT, or polycarbonate.

The present invention preferably relates to the use of 10,10'-oxybis-12H-phthaloperin-12-one for production of polyester-based high-voltage components, with the proviso that these have a color difference $\Delta E<20$ from the L*a*b* coordinates of a color number beginning with "2" in the RAL color chart, preferably a $\Delta E<10$, more preferably $\Delta E<5$, and a laser transparency at a wavelength of 980 nm of at least 5%. Polyesters to be used with preference are $C_2$-$C_{10}$-polyalkylene terephthalate, especially PBT, or polycarbonate.

The present invention more preferably relates to the use of 10,10'-oxybis-12H-phthaloperin-12-one for production of polyester-based high-voltage components for electromobility, with the proviso that these have a color difference $\Delta E<20$ from the L*a*b* coordinates of a color number beginning with "2" in the RAL color chart, preferably a $\Delta E<10$, more preferably $\Delta E<5$, and a laser transparency at a wavelength of 980 nm of at least 5%. Polyesters to be used with preference are $C_2$-$C_{10}$-polyalkylene terephthalate, especially PBT, or polycarbonate.

At present, there is no standard forming a basis on which a measurement of laser transparency has to be carried out. Laser transmittance is therefore determined in the context of the present invention at a wavelength of 1064 nm by means of a thermoelectric measurement of power. The measurement geometry can be described as follows: A reference beam is divided at an angle of 90° with a power of 1 watt from a laser beam (diode-pumped Nd-YAG laser having a wavelength of 1064 nm, FOBA DP50) having a total power of 2 watts by means of a beam divider (SQ2 non-polarizing beam divider from Laser-optik GmbH). This hits the reference sensor. The part of the original beam that passes through the beam divider constitutes the measurement beam, likewise with power 1 watt. This is focused by a mode shutter (5.0) beyond the beam divider to a focus having diameter 0.18 mm. The laser transparency (LT) measurement sensor is positioned at a distance of 80 mm beneath the focus. The test plaque is positioned at a distance of 2 mm above the LT measurement sensor. Preferably in accordance with the invention, the test plaques are injection-molded test plaques with dimensions of 60·60·2 $mm^3$, with edge gating.

The measurement is made in the middle of the plaque (intersection of the two diagonals). The total measurement time is 30 s, with the measurement result being ascertained in the last 5 s. The signals from reference sensor and measurement sensor are detected simultaneously. The start of the measurement is simultaneous with the insertion of the sample. Transmittance and hence laser transparency (LT) are found from the following formula:

$$LT = signal_{measurement\ sensor}/signal_{reference\ sensor} \times 100\%$$

This mode of measurement rules out fluctuations in the laser system and subjective reading errors. For each plaque, the LT average is formed from at least five measurements. The formation of the average is conducted on 10 plaques for each material. The averages of the individual plaque measurements are ultimately used to calculate the mean and standard deviation for the material to be examined. In the context of the present invention, a polymer composition, a product, a high-voltage component or a high-voltage component for electromobility is laser-transparent when it is at least 33%, measured at 1064 nm on a shaped body of thickness 2 mm.

Irrespective of the process variant, the laser welding process is highly dependent on the material properties of the two joining partners. The degree of laser transparency (LT) of the part through which the laser passes directly influences the process speed by virtue of the amount of energy that can be introduced per unit time. Semicrystalline thermoplastics generally have lower laser transparency by virtue of their inherent microstructure, usually in the form of spherulites. These scatter the incident laser light more significantly than the internal structure of a purely amorphous thermoplastic: Backscatter leads to a reduced amount of total energy in transmission; diffuse (lateral) scatter often leads to broadening of the laser beam and hence loss of welding precision. A semicrystalline morphology is generally a hindrance to high laser transparency, but offers advantages in other properties. For instance, semicrystalline materials are mechanically durable even above the glass transition temperature and generally have better chemical resistance than amorphous materials. Rapidly crystallizing materials additionally offer advantages in processing, especially rapid demoldability and hence short cycle times. What is therefore desirable is combination of semicrystallinity, rapid crystallization and high laser transparency. The selection of further components C) fillers or reinforcers, D) flame-retardant additive and E) any further additives, has to be made with the proviso that, firstly, the products, high-voltage components and high-voltage components for electromobility that are to be produced from the polymer compositions have a color difference $\Delta E<20$ from the L*a*b* coordinates of a color number beginning with "2" in the RAL color chart, and also a laser transparency of at least 33%.

Preference is given in accordance with the invention to the use of 10,10'-oxybis-12H-phthaloperin-12-one for production of polyester-based products, wherein A) per 100 parts by mass of at least one polyester, preferably a $C_2$-$C_{10}$-polyalkylene terephthalate, especially PBT, or polycarbonate, B) 0.01 to 5 parts by mass of 10,10'-oxybis-12H-phthaloperin-12-one and C) 1 to 150 parts by mass of at least one filler and reinforcer to be selected from the group of glass beads or solid or hollow glass beads, or glass fibers, or ground glass, amorphous quartz glass, aluminum borosilicate glass having an alkali content of 1% (E glass), amorphous silica, quartz flour, calcium silicate, calcium metasilicate, magnesium carbonate, kaolin, calcined kaolin, chalk, kyanite, powdered or ground quartz, mica, phlogopite, barium sulfate, feldspar, wollastonite, montmorillonite, pseudoboehmite of the formula AlO(OH), magnesium carbonate and talc, especially glass fibers are used, with the proviso of a color difference $\Delta E<20$ from the L*a*b* coordinates of a color number beginning with "2" in the RAL color chart, preferably a $\Delta E<10$, more preferably $\Delta E<5$, and a laser transparency at a wavelength of 980 nm of at least 5%. Polyester-based products, especially high-voltage components, preferably have a laser transparency at a wavelength of 980 nm of at least 10%, more preferably in the range from 25% to 98%, especially in the range from 25% to 60%.

Preference is given in accordance with the invention to the use of 10,10'-oxybis-12H-phthaloperin-12-one for production of laser-transparent polyester-based products, wherein A) per 100 parts by mass of at least one polyester, preferably a $C_2$-$C_{10}$-polyalkylene terephthalate, especially PBT, or polycarbonate, B) 0.01 to 5 parts by mass of 10,10'-oxybis-12H-phthaloperin-12-one, C) 1 to 150 parts by mass of at least one filler and reinforcer, preferably to be selected from the group of glass beads or solid or hollow glass beads, or glass fibers, or ground glass, amorphous quartz glass, aluminum borosilicate glass having an alkali content of 1% (E glass), amorphous silica, quartz flour, calcium silicate, calcium metasilicate, magnesium carbonate, kaolin, calcined kaolin, chalk, kyanite, powdered or ground quartz, mica, phlogopite, barium sulfate, feldspar, wollastonite, montmorillonite, pseudoboehmite of the formula AlO(OH), magnesium carbonate and talc, especially glass fibers, and D) 3 to 100 parts by mass of at least one flame retardant additive, preferably to be selected from mineral flame retardants, nitrogen-containing flame retardants or phosphorus-containing flame retardants, are used, with the proviso of a color difference $\Delta E<20$ from the L*a*b* coordinates of a color number beginning with "2" in the RAL color chart, preferably a $\Delta E<10$, more preferably $\Delta E<5$, and a laser transparency at a wavelength of 980 nm of at least 5%.

Preference is given to the use of 10,10'-oxybis-12H-phthaloperin-12-one for production of laser-transparent polyester-based products, with particular emphasis on high-voltage components, especially high-voltage components for electromobility.

Use of 10,10'-Oxybis-12H-phthaloperin-12-one for Laser-Absorbing Products and High-Voltage Components In the case of use of 10,10'-oxybis-12H-phthaloperin-12-one for laser-absorbing products and high-voltage components, especially high-voltage components for electromobility, laser absorbers are selected from the group of antimony trioxide, tin oxide, tin orthophosphate, barium titanate, aluminum oxide, copper hydroxyphosphate, copper orthophosphate, potassium copper diphosphate, copper hydroxide, antimony tin oxide, bismuth trioxide and anthraquinone. Tin oxide, antimony trioxide or antimony tin oxide are particularly preferred. Antimony trioxide is very particularly preferred.

The present invention therefore also relates to the use of 10,10'-oxybis-12H-phthaloperin-12-one for production of polyester-based products, with the proviso of a color difference $\Delta E<20$ from the L*a*b* coordinates of a color number beginning with "2" in the RAL color chart, preferably a ΔE<10, more preferably ΔE<5, comprising at least one laser absorber selected from the group of antimony trioxide, tin oxide, tin orthophosphate, barium titanate, aluminum oxide, copper hydroxyphosphate, copper orthophosphate, potassium copper diphosphate, copper hydroxide, antimony tin oxide, bismuth trioxide and anthraquinone. Polyesters to be used with preference are $C_2$-$C_{10}$-polyalkylene terephthalate, especially PBT, or polycarbonate.

The present invention preferably relates to the use of 10,10'-oxybis-12H-phthaloperin-12-one for production of polyester-based high-voltage components, with the proviso of a color difference ΔE<20 from the L*a*b* coordinates of a color number beginning with "2" in the RAL color chart, preferably a ΔE<10, more preferably ΔE<5, comprising at least one laser absorber selected from the group of antimony trioxide, tin oxide, tin orthophosphate, barium titanate, aluminum oxide, copper hydroxyphosphate, copper orthophosphate, potassium copper diphosphate, copper hydroxide, antimony tin oxide, bismuth trioxide and anthraquinone. Polyesters to be used with preference are $C_2$-$C_{10}$-polyalkylene terephthalate, especially PBT, or polycarbonate.

The present invention more preferably relates to the use of 10,10'-oxybis-12H-phthaloperin-12-one for production of polyester-based high-voltage components for electromobility, with the proviso of a color difference ΔE<20 from the L*a*b* coordinates of a color number beginning with "2" in the RAL color chart, preferably a ΔE<10, more preferably ΔE<5, comprising at least one laser absorber selected from the group of antimony trioxide, tin oxide, tin orthophosphate, barium titanate, aluminum oxide, copper hydroxyphosphate, copper orthophosphate, potassium copper diphosphate, copper hydroxide, antimony tin oxide, bismuth trioxide and anthraquinone. Polyesters to be used with preference are $C_2$-$C_{10}$-polyalkylene terephthalate, especially PBT, or polycarbonate.

Preference is given in accordance with the invention to the use of 10,10'-oxybis-12H-phthaloperin-12-one for production of polyester-based products, preferably high-voltage components, wherein A) per 100 parts by mass of at least one polyester, preferably a $C_2$-$C_{10}$-polyalkylene terephthalate, especially PBT, or polycarbonate, B) 0.01 to 5 parts by mass of 10,10'-oxybis-12H-phthaloperin-12-one and E) at least one laser absorber selected from the group of antimony trioxide, tin oxide, tin orthophosphate, barium titanate, aluminum oxide, copper hydroxyphosphate, copper orthophosphate, potassium copper diphosphate, copper hydroxide, antimony tin oxide, bismuth trioxide and anthraquinone are used, with the proviso of a color difference ΔE<20 from the L*a*b* coordinates of a color number beginning with "2" in the RAL color chart, preferably a ΔE<10, more preferably ΔE<5.

Preference is given in accordance with the invention to the use of 10,10'-oxybis-12H-phthaloperin-12-one for production of polyester-based products, preferably high-voltage components, wherein A) per 100 parts by mass of at least one polyester, preferably a $C_2$-$C_{10}$-polyalkylene terephthalate, especially PBT, or polycarbonate, B) 0.01 to 5 parts by mass of 10,10'-oxybis-12H-phthaloperin-12-one, C) 1 to 150 parts by mass of at least one filler and reinforcer to be selected from the group of glass beads or solid or hollow glass beads, or glass fibers, or ground glass, amorphous quartz glass, aluminum borosilicate glass having an alkali content of 1% (E glass), amorphous silica, quartz flour, calcium silicate, calcium metasilicate, magnesium carbonate, kaolin, calcined kaolin, chalk, kyanite, powdered or ground quartz, mica, phlogopite, barium sulfate, feldspar, wollastonite, montmorillonite, pseudoboehmite of the formula AlO(OH), magnesium carbonate and talc, especially glass fibers, and E) at least one laser absorber selected from the group of antimony trioxide, tin oxide, tin orthophosphate, barium titanate, aluminum oxide, copper hydroxyphosphate, copper orthophosphate, potassium copper diphosphate, copper hydroxide, antimony tin oxide, bismuth trioxide and anthraquinone are used, with the proviso of a color difference ΔE<20 from the L*a*b* coordinates of a color number beginning with "2" in the RAL color chart, preferably a ΔE<10, more preferably ΔE<5.

Preference is given in accordance with the invention to the use of 10,10'-oxybis-12H-phthaloperin-12-one for production of polyester-based products, preferably high-voltage components, wherein A) per 100 parts by mass of at least one polyester, preferably a $C_2$-$C_{10}$-polyalkylene terephthalate, especially PBT, or polycarbonate, B) 0.01 to 5 parts by mass of 10,10'-oxybis-12H-phthaloperin-12-one, C) 1 to 150 parts by mass of at least one filler and reinforcer, preferably to be selected from the group of glass beads or solid or hollow glass beads, or glass fibers, or ground glass, amorphous quartz glass, aluminum borosilicate glass having an alkali content of 1% (E glass), amorphous silica, quartz flour, calcium silicate, calcium metasilicate, magnesium carbonate, kaolin, calcined kaolin, chalk, kyanite, powdered or ground quartz, mica, phlogopite, barium sulfate, feldspar, wollastonite, montmorillonite, pseudoboehmite of the formula AlO(OH), magnesium carbonate and talc, especially glass fibers, and D) 3 to 100 parts by mass of at least one flame retardant additive, preferably to be selected from mineral flame retardants, nitrogen-containing flame retardants and phosphorus-containing flame retardants, and E) at least one laser absorber selected from the group of antimony trioxide, tin oxide, tin orthophosphate, barium titanate, aluminum oxide, copper hydroxyphosphate, copper orthophosphate, potassium copper diphosphate, copper hydroxide, antimony tin oxide, bismuth trioxide and anthraquinone are used, with the proviso of a color difference ΔE<20 from the L*a*b* coordinates of a color number beginning with "2" in the RAL color chart, preferably a ΔE<10, more preferably ΔE<5.

By way of clarification, it should be noted that the scope of the present invention encompasses all definitions and parameters listed in general in the context of the polymer compositions or high-voltage components or specified in areas of preference in any combinations of the uses of the invention.

EXAMPLES

The improvements in properties described in accordance with the invention were demonstrated by first making up corresponding polyester-based polymer compositions by compounding. For this purpose, the individual components were mixed in a twin-screw extruder (ZSK 25 Compounder from Coperion Werner & Pfleiderer (Stuttgart, Germany)) at temperatures in the range from 260 to 320° C., discharged as a strand, cooled until pelletizable and pelletized. After drying (generally for two days at 80° C. in a vacuum drying cabinet), the pellets were processed by injection molding at temperatures in the range from 270 to 300° C. to give standard test specimens for the respective tests.

In the context of the present tests, bleeding was measured via the discoloration of a 30·20·2 mm$^3$ plasticized PVC film (P-PVC, FB110 white, standard low temperature resistance from Jedi Kunststofftechnik GmbH, Eitorf, Germany) which was stored in a hot air drying cabinet at 80° C. for 12 hours clamped between 2 plastic sheets of dimensions 60·40·2 mm$^3$ based on the compositions described in table 2. This was followed by visual evaluation according to the gray scale of ISO 105-A02, with '5' meaning that the PVC film showed no color change and '1' meaning that the PVC film showed a significant color change.

Reactants:
  Component A) Linear polybutylene terephthalate (Pocan® B 1300, commercially available product of Lanxess Deutschland GmbH, Cologne, Germany) having an intrinsic viscosity of 93 cm$^3$/g (measured in phenol: 1,2-dichlorobenzene=1:1 at 25° C.)
  Component B): 10,10'-Oxybis-12H-phthaloperin-12-one [CAS No. 203576-97-0] from Angene International Limited, London
  Component X/1): 12H-Phthaloperin-12-one [CAS No. 6925-69-5] in the form of Macrolex® Orange 3G from Lanxess Deutschland GmbH, Cologne

TABLE II

|  |  | Ex. 1 | Comp. 1 |
|---|---|---|---|
| Component A) | parts by mass | 100 | 100 |
| Component B) | parts by mass | 0.3 |  |
| Component X/1) | parts by mass |  | 0.3 |
| Bleeding | Gray scale | 4 | 2 |
| Transmission | Classification | + | n.d. |

The results in tab. II show that inventive example 1 shows laser transparency with simultaneously lower bleeding than the material colored with component X/1 according to the prior art in comp. 1. The plastic plaques examined in inventive example 1 had a RAL color value of 2009 with a ΔE of <5. n.d. stands for "not determined" at the filing date of this invention.

Laser transparency of the specimens analyzed in the context of the present application was measured in the near IR (NIR) at a laser wavelength of 980 nm in accordance with DVS-Richtlinie 2243 (January 2014) "Laserstrahlschweißen thermoplastischer Kunststoffe" using plaques having dimensions of 60 mm·60 mm·2 mm with the LPKF TMG3 transmittance analyzer from LPKF Laser & Electronics AG, Garbsen, Germany, calibrated beforehand with an analytical standard generated according to DIN EN ISO/IEC 17025; see: LPKF AG 101016-DE: "Einfache Transmissionsmessung für Kunststoffe LPKF TMG3". The assessment and classification was made as a relative comparison of laser transmittance compared to a test plaque without component B) to be used in the invention.

Classification (+): Transmittance of the test plaques comprising ingredients to be used in accordance with the invention including component B) was at least 80% of the transmittance of an analogous test plaque where only component B) was absent.

Classification (−): Transmittance of the test plaques comprising ingredients to be used in accordance with the invention including component B) was less than 80% of the transmittance of an analogous test plaque where only component B) was absent.

What is claimed is:

1. An electromobility assembly comprising:
    a voltage conducting part having an operating voltage according to class B of ISO6469-2:2018, and
    a high-voltage component in direct contact with or directly adjacent to the voltage-conducing part, wherein the high-voltage component comprises a polymer composition comprising:
    (A) at least one polyester, and
    (B) a 10,10'-oxybis-12H-phthaloperin-12-one dye, wherein the 10,10'-oxybis-12H-phthaloperin-12-one dye component (B) is present in an amount of 0.01 to 5 parts by mass per 100 parts by mass of the at least one polyester component (A) which is sufficient to achieve, (i) an orange color corresponding to a color distance ΔE<20 from the L*a*b* coordinates of a color number beginning with "2" in the RAL color chart, and (ii) reduced contact bleeding of the 10,10'-oxybis-12H-phthaloperin-12-one component (B) as compared to a high-voltage component having 12H-phthaloperin-12-one as component (B).

2. The electromobility assembly according to claim 1, wherein the polymer composition comprises, per 100 parts by mass of the at least one polyester, 0.01 to 3 parts by mass of the 10,10'-oxy-bis-12H-phthaloperin-12-one dye.

3. The electromobility assembly according to claim 2, wherein the polymer composition further comprises:
    (E) at least one laser absorber selected from the group consisting of antimony trioxide, tin oxide, tin orthophosphate, barium titanate, aluminum oxide, copper hydroxyphosphate, copper orthophosphate, potassium copper diphosphate, copper hydroxide, antimony tin oxide, bismuth trioxide and anthraquinone.

4. The electromobility assembly according to claim 2, wherein the polymer composition further comprises:
    (D) at least one flame retardant in an amount of 3 to 100 parts by mass based on 100 parts by mass of the at least one polyester component (A).

5. The electromobility assembly according to claim 2, wherein the polymer composition further comprises:
    (D) at least one flame retardant.

6. The electromobility assembly according to claim 1, wherein the at least one polyester is a polycarbonate or a $C_2$-$C_{10}$ polyalkylene terephthalate.

7. The electromobility assembly according to claim 1, wherein laser-absorbing additives which absorb or scatter laser light within a wavelength range of 600 to 1200 nm are omitted from the polymer composition.

8. The electromobility assembly according to claim 1, wherein the polymer composition further comprises:
    (C) at least one filler and/or reinforcer.

9. The electromobility assembly according to claim 8, wherein the polymer composition further comprises:
    (D) at least one flame retardant.

10. The electromobility assembly according to claim 9, wherein the flame retardant is at least one selected from the group consisting of mineral flame retardants, nitrogen-containing flame retardants and phosphorus-containing flame retardants.

11. The electromobility assembly according to claim 8, wherein the filler and/or reinforcer is at least one selected from the group consisting of solid or hollow glass beads, glass fibers, ground glass, amorphous quartz glass, aluminum borosilicate glass having an alkali content of 1% (E glass), amorphous silica, quartz flour, calcium silicate, calcium metasilicate, magnesium carbonate, kaolin, calcined kaolin, chalk, kyanite, powdered or ground quartz, mica, phlogopite, barium sulfate, feldspar, wollastonite, montmorillonite, pseudoboehmite of the formula AlO(OH), magnesium carbonate and talc.

12. The electromobility assembly according to claim 11, wherein the polymer composition further comprises:
- (E) at least one heat stabilizer selected from the group consisting of sterically hindered phenols.

13. The electromobility assembly according to claim 8, wherein the polymer composition further comprises:
- (D) at least one flame retardant in an amount of 3 to 100 parts by mass based on 100 parts by mass of the at least one polyester component (A).

14. The electromobility assembly according to claim 1, wherein the high-voltage component comprises covers for electrics or electronics, control devices, covers/housings for fuses, relays, battery cell modules, fuse holders, fuse plugs, terminals, cable holders or sheathings.

15. The electromobility assembly according to claim 1, wherein the at least one polyester comprises polybutylene terephthalate.

16. The electromobility assembly according to claim 1, wherein the polymer composition further comprises:
- (C) at least one filler and/or reinforcer in an amount of 1 to 150 parts by mass based on 100 parts by mass of the at least one polyester component (A).

\* \* \* \* \*